(12) United States Patent
Sellers et al.

(10) Patent No.: US 7,774,799 B1
(45) Date of Patent: *Aug. 10, 2010

(54) SYSTEM AND METHOD FOR LINKING PAGE CONTENT WITH A MEDIA FILE AND DISPLAYING THE LINKS

(75) Inventors: Timothy D. Sellers, Bellevue, WA (US); Simon Clarke, Seattle, WA (US); Mark Yalovsky, Seattle, WA (US); Olga Veselova, Cambridge, MA (US); Myungsub Kim, Redmond, WA (US); Jeffry N. Cardon, Duvall, WA (US)

(73) Assignee: Microsoft Corporation, Redmond, WA (US)

( * ) Notice: Subject to any disclaimer, the term of this patent is extended or adjusted under 35 U.S.C. 154(b) by 493 days.

This patent is subject to a terminal disclaimer.

(21) Appl. No.: 10/397,103

(22) Filed: Mar. 26, 2003

(51) Int. Cl.
*G06F 13/00* (2006.01)

(52) U.S. Cl. .................... 719/329; 715/805

(58) Field of Classification Search .............. 719/329; 715/805
See application file for complete search history.

(56) References Cited

U.S. PATENT DOCUMENTS

| | | | |
|---|---|---|---|
| 5,202,828 A | 4/1993 | Vertelney et al. ............ 714/810 |
| 5,493,692 A | 2/1996 | Theimer et al. | |
| 5,530,794 A | 6/1996 | Luebbert ..................... 715/524 |
| 5,537,628 A | 7/1996 | Luebbert ..................... 715/524 |
| 5,544,321 A | 8/1996 | Theimer et al. | |
| 5,555,376 A | 9/1996 | Theimer et al. | |
| 5,563,996 A | 10/1996 | Tchao ......................... 715/521 |
| 5,596,656 A | 1/1997 | Goldberg | |
| 5,603,054 A | 2/1997 | Theimer et al. | |
| 5,611,050 A | 3/1997 | Theimer et al. | |
| 5,625,783 A | 4/1997 | Ezekiel et al. | |
| 5,625,810 A | 4/1997 | Kurosu et al. | |
| 5,701,424 A | 12/1997 | Atkinson | |

(Continued)

FOREIGN PATENT DOCUMENTS

EP          0569133 A2      11/1993

(Continued)

OTHER PUBLICATIONS

Copending U.S. Appl. No. 11/063,309 entitled "System and Method for Linking Page Content With a Video Media File and Displaying the Links," filed Feb. 22, 2005.

(Continued)

*Primary Examiner*—Andy Ho
(74) *Attorney, Agent, or Firm*—Merchant & Gould P.C.

(57) ABSTRACT

A method and system link page content with a media file and display these links during playback of the media file. In other words, the present invention can link notes stored in an electronic document with media such as audio stored in an audio file. As media is played back from the media file, the present invention can display visual indicators adjacent to or over page content so that a user can see how page content relates to the media file. According to one exemplary aspect of the present invention, page content can be highlighted when the page content has a relationship with the media that is being played. That is, page content can be highlighted at different times as the recorded live information from a media file such as audio from an audio file is being played back.

19 Claims, 13 Drawing Sheets

U.S. PATENT DOCUMENTS

| | | | |
|---|---|---|---|
| 5,724,595 A | 3/1998 | Gentner | |
| 5,724,959 A | 3/1998 | Gentner | |
| 5,734,915 A | 3/1998 | Roewer | |
| 5,752,254 A | 5/1998 | Sakairi | 715/530 |
| 5,760,768 A | 6/1998 | Gram | |
| 5,761,683 A | 6/1998 | Logan et al. | |
| 5,765,156 A | 6/1998 | Guzak et al. | |
| 5,778,346 A | 7/1998 | Frid-Nielsen et al. | |
| 5,781,192 A | 7/1998 | Kodimer | |
| 5,798,760 A | 8/1998 | Vayda et al. | |
| 5,801,693 A | 9/1998 | Bailey | 715/769 |
| 5,812,865 A | 9/1998 | Theimer et al. | |
| 5,838,321 A | 11/1998 | Wolf | |
| 5,855,006 A | 12/1998 | Huemoeller et al. | |
| 5,870,522 A | 2/1999 | Dozier et al. | |
| 5,884,306 A | 3/1999 | Bliss et al. | |
| 5,898,434 A | 4/1999 | Small et al. | 715/810 |
| 5,924,099 A | 7/1999 | Guzak et al. | |
| 5,940,078 A | 8/1999 | Nagarajayya et al. | |
| 5,958,008 A | 9/1999 | Pogrebisky et al. | |
| 5,970,455 A | 10/1999 | Wilcox et al. | |
| 5,970,466 A | 10/1999 | Detjen et al. | |
| 5,999,938 A | 12/1999 | Bliss et al. | |
| 6,002,402 A | 12/1999 | Schacher | 715/810 |
| 6,025,837 A | 2/2000 | Matthews, III et al. | |
| 6,034,686 A | 3/2000 | Lamb et al. | |
| 6,057,845 A | 5/2000 | Dupouy | |
| 6,065,012 A | 5/2000 | Balsara et al. | |
| 6,177,939 B1 | 1/2001 | Blish et al. | 715/770 |
| 6,233,591 B1 | 5/2001 | Sherman et al. | |
| 6,249,283 B1 | 6/2001 | Ur | |
| 6,262,724 B1 | 7/2001 | Crow et al. | |
| 6,269,389 B1 | 7/2001 | Ashe | 718/100 |
| 6,275,940 B1 * | 8/2001 | Edwards et al. | 713/200 |
| 6,278,450 B1 | 8/2001 | Arcuri et al. | |
| 6,282,548 B1 | 8/2001 | Burner et al. | |
| 6,309,305 B1 | 10/2001 | Kraft | 455/566 |
| 6,310,622 B1 | 10/2001 | Assente | |
| 6,310,634 B1 | 10/2001 | Bodnar et al. | |
| 6,321,242 B1 | 11/2001 | Fogg et al. | |
| 6,389,434 B1 | 5/2002 | Rivette et al. | |
| 6,411,311 B1 | 6/2002 | Rich et al. | |
| 6,429,882 B1 | 8/2002 | Abdelnur et al. | |
| 6,433,801 B1 | 8/2002 | Moon et al. | |
| 6,448,987 B1 | 9/2002 | Easty et al. | |
| 6,459,441 B1 | 10/2002 | Perroux et al. | |
| 6,466,232 B1 | 10/2002 | Newell et al. | |
| 6,490,634 B2 | 12/2002 | Coiner | 719/329 |
| 6,499,041 B1 | 12/2002 | Breslau et al. | |
| 6,513,046 B1 | 1/2003 | Abbott, III et al. | |
| 6,549,219 B2 | 4/2003 | Selker | |
| 6,549,915 B2 | 4/2003 | Abbott, III et al. | |
| 6,572,660 B1 | 6/2003 | Okamoto | |
| 6,606,653 B1 | 8/2003 | Ackerman et al. | |
| 6,618,732 B1 | 9/2003 | White et al. | |
| 6,651,059 B1 | 11/2003 | Sundaresan et al. | |
| 6,686,938 B1 | 2/2004 | Jobs et al. | |
| 6,694,087 B1 | 2/2004 | Weaver | |
| 6,704,770 B1 | 3/2004 | Ramakesavan | |
| 6,708,202 B1 | 3/2004 | Shuman et al. | |
| 6,735,347 B1 | 5/2004 | Bates et al. | 382/282 |
| 6,747,675 B1 | 6/2004 | Abbott et al. | |
| 6,751,777 B2 | 6/2004 | Bates et al. | |
| 6,763,496 B1 | 7/2004 | Hennings et al. | |
| 6,789,228 B1 * | 9/2004 | Merril et al. | 715/500.1 |
| 6,791,580 B1 | 9/2004 | Abbott et al. | |
| 6,801,223 B1 | 10/2004 | Abbott et al. | |
| 6,802,041 B1 | 10/2004 | Rehm | |
| 6,812,937 B1 | 11/2004 | Abbott et al. | |
| 6,826,729 B1 | 11/2004 | Giesen et al. | |
| 6,836,270 B2 | 12/2004 | Du | |
| 6,842,877 B2 | 1/2005 | Robarts et al. | |
| 6,848,075 B1 | 1/2005 | Becker et al. | |
| 6,918,091 B2 | 7/2005 | Leavitt et al. | |
| 6,924,797 B1 | 8/2005 | MacPhail | |
| 6,925,496 B1 | 8/2005 | Ingram et al. | |
| 6,944,821 B1 | 9/2005 | Bates et al. | 715/530 |
| 6,970,867 B1 | 11/2005 | Hsu et al. | |
| 7,032,210 B2 | 4/2006 | Alloing et al. | |
| 7,039,234 B2 | 5/2006 | Geidl et al. | |
| 7,114,128 B2 | 9/2006 | Koppolu et al. | |
| 7,143,338 B2 | 11/2006 | Bauchot et al. | |
| 7,165,098 B1 | 1/2007 | Boyer et al. | |
| 7,184,955 B2 | 2/2007 | Obrador et al. | |
| 7,185,050 B2 | 2/2007 | Eld et al. | |
| 7,188,073 B1 | 3/2007 | Tam et al. | |
| 7,210,107 B2 | 4/2007 | Wecker et al. | |
| 7,254,785 B2 | 8/2007 | Reed | |
| 7,406,501 B2 | 7/2008 | Szeto et al. | |
| 7,454,763 B2 | 11/2008 | Veselova et al. | |
| 7,460,713 B2 | 12/2008 | Lapstun et al. | |
| 7,555,707 B1 | 6/2009 | Labarge et al. | |
| 2001/0032214 A1 | 10/2001 | Bauchot et al. | |
| 2001/0040590 A1 | 11/2001 | Abbott et al. | |
| 2001/0040591 A1 | 11/2001 | Abbott et al. | |
| 2001/0043231 A1 | 11/2001 | Abbott et al. | |
| 2001/0043232 A1 | 11/2001 | Abbott et al. | |
| 2002/0032689 A1 | 3/2002 | Abbott, III et al. | |
| 2002/0044152 A1 | 4/2002 | Abbott, III et al. | |
| 2002/0049785 A1 | 4/2002 | Bauchot | |
| 2002/0052930 A1 | 5/2002 | Abbott et al. | |
| 2002/0052963 A1 | 5/2002 | Abbott et al. | |
| 2002/0054130 A1 | 5/2002 | Abbott, III et al. | |
| 2002/0054174 A1 | 5/2002 | Abbott et al. | |
| 2002/0078180 A1 | 6/2002 | Miyazawa | |
| 2002/0078204 A1 | 6/2002 | Newell et al. | |
| 2002/0080155 A1 | 6/2002 | Abbott et al. | |
| 2002/0080156 A1 | 6/2002 | Abbott et al. | |
| 2002/0083025 A1 | 6/2002 | Robarts et al. | |
| 2002/0083158 A1 | 6/2002 | Abbott et al. | |
| 2002/0087525 A1 | 7/2002 | Abbott et al. | |
| 2002/0087534 A1 | 7/2002 | Blackman et al. | |
| 2002/0087642 A1 * | 7/2002 | Wei et al. | 709/206 |
| 2002/0091739 A1 | 7/2002 | Ferlitsch et al. | |
| 2002/0099777 A1 | 7/2002 | Gupta et al. | |
| 2002/0099817 A1 | 7/2002 | Abbott et al. | |
| 2002/0120697 A1 | 8/2002 | Generous | |
| 2002/0133520 A1 | 9/2002 | Tanner | |
| 2002/0138582 A1 | 9/2002 | Chandra et al. | |
| 2002/0140731 A1 | 10/2002 | Subramaniam et al. | |
| 2002/0161800 A1 | 10/2002 | Eld et al. | |
| 2002/0161804 A1 | 10/2002 | Chiu et al. | |
| 2002/0196293 A1 | 12/2002 | Suppan et al. | |
| 2003/0013483 A1 | 1/2003 | Ausems et al. | |
| 2003/0014395 A1 | 1/2003 | Ruvolo et al. | |
| 2003/0014490 A1 | 1/2003 | Bates et al. | |
| 2003/0020749 A1 | 1/2003 | Abu-Hakima et al. | |
| 2003/0046401 A1 | 3/2003 | Abbott et al. | |
| 2003/0050927 A1 | 3/2003 | Hussam | 707/5 |
| 2003/0069877 A1 | 4/2003 | Grefenstette et al. | 707/2 |
| 2003/0070143 A1 | 4/2003 | Maslov | |
| 2003/0076352 A1 * | 4/2003 | Uhlig et al. | 345/738 |
| 2003/0084104 A1 | 5/2003 | Salem et al. | |
| 2003/0088534 A1 | 5/2003 | Kalantar et al. | |
| 2003/0097361 A1 | 5/2003 | Huang et al. | |
| 2003/0100999 A1 | 5/2003 | Markowitz | |
| 2003/0135565 A1 | 7/2003 | Estrada | |
| 2003/0154254 A1 | 8/2003 | Awasthi | |
| 2003/0154476 A1 | 8/2003 | Abbott, III et al. | |
| 2003/0172168 A1 | 9/2003 | Mak et al. | |
| 2003/0172384 A1 | 9/2003 | Comps | |
| 2003/0187930 A1 | 10/2003 | Ghaffar et al. | |
| 2003/0196196 A1 | 10/2003 | Nylander et al. | |
| 2003/0212680 A1 | 11/2003 | Bates et al. | |

| | | |
|---|---|---|
| 2003/0222899 A1 | 12/2003 | Alvesalo |
| 2004/0001093 A1 | 1/2004 | Sellers et al. |
| 2004/0039779 A1 | 2/2004 | Amstrong et al. |
| 2004/0054736 A1 | 3/2004 | Daniell et al. |
| 2004/0063400 A1 | 4/2004 | Kim |
| 2004/0073679 A1 | 4/2004 | Martens et al. |
| 2004/0098398 A1 | 5/2004 | Ahn et al. |
| 2004/0109033 A1 | 6/2004 | Vienneau et al. |
| 2004/0128613 A1 | 7/2004 | Sinisi |
| 2004/0153445 A1 | 8/2004 | Horvitz et al. |
| 2004/0158611 A1 | 8/2004 | Daniell et al. |
| 2004/0168119 A1 | 8/2004 | Liu et al. |
| 2004/0117319 A1 | 9/2004 | Horn |
| 2004/0172455 A1 | 9/2004 | Green et al. |
| 2004/0174392 A1 | 9/2004 | Bjoernsen et al. |
| 2004/0177122 A1 | 9/2004 | Appelman |
| 2004/0189694 A1 | 9/2004 | Kurtz et al. |
| 2004/0194025 A1 | 9/2004 | Hubert et al. |
| 2004/0221243 A1 | 11/2004 | Twerdahl et al. |
| 2004/0230599 A1 | 11/2004 | Moore et al. |
| 2004/0243677 A1 | 12/2004 | Curbow et al. |
| 2004/0243941 A1 | 12/2004 | Fish |
| 2004/0267625 A1 | 12/2004 | Feng et al. |
| 2004/0267706 A1 | 12/2004 | Springer et al. |
| 2004/0268231 A1 | 12/2004 | Tunning |
| 2004/0268263 A1 | 12/2004 | Van Dok et al. |
| 2005/0004989 A1 | 1/2005 | Satterfield et al. |
| 2005/0004990 A1 | 1/2005 | Durazo et al. |
| 2005/0005235 A1 | 1/2005 | Satterfield et al. |
| 2005/0005249 A1 | 1/2005 | Hill et al. |
| 2005/0010871 A1 | 1/2005 | Ruthfield et al. |
| 2005/0034078 A1 | 2/2005 | Abbott et al. |
| 2005/0055424 A1 | 3/2005 | Smith .................... 709/219 |
| 2005/0064852 A1 | 3/2005 | Baldursson |
| 2005/0097465 A1 | 5/2005 | Giesen et al. |
| 2005/0102365 A1 | 5/2005 | Moore et al. |
| 2005/0102607 A1 | 5/2005 | Rousselle et al. |
| 2005/0102639 A1 | 5/2005 | Dove |
| 2005/0108619 A1 | 5/2005 | Theall et al. |
| 2005/0114521 A1 | 5/2005 | Lee |
| 2005/0119018 A1 | 6/2005 | Kim |
| 2005/0125717 A1 | 6/2005 | Segal et al. |
| 2005/0149851 A1 | 7/2005 | Mittal |
| 2005/0154761 A1 | 7/2005 | Lee et al. |
| 2005/0165795 A1 | 7/2005 | Myka et al. |
| 2005/0168154 A1 | 7/2005 | Wilson et al. |
| 2005/0175089 A1 | 8/2005 | Jung |
| 2005/0183008 A1 | 8/2005 | Crider et al. |
| 2005/0208962 A1 | 9/2005 | Kim |
| 2005/0233744 A1 | 10/2005 | Karaoguz |
| 2005/0240590 A1 | 10/2005 | Shimizu et al. |
| 2005/0245241 A1 | 11/2005 | Durand |
| 2005/0286414 A1 | 12/2005 | Young et al. .................... 370/216 |
| 2005/0289109 A1 | 12/2005 | Arrouye et al. |
| 2006/0036945 A1 | 2/2006 | Radtke et al. |
| 2006/0036950 A1 | 2/2006 | Himberger et al. |
| 2006/0036965 A1 | 2/2006 | Horn et al. |
| 2006/0009604 A1 | 3/2006 | Leukart et al. |
| 2006/0053379 A1 | 3/2006 | Henderson et al. |
| 2006/0069603 A1 | 3/2006 | Williams et al. |
| 2006/0069617 A1 | 3/2006 | Milener et al. |
| 2006/0075347 A1 | 4/2006 | Rehm |
| 2006/0095452 A1 | 5/2006 | Jansson et al. |
| 2006/0139709 A1 | 6/2006 | Bifano et al. |
| 2006/0150109 A1 | 7/2006 | Schultz et al. |
| 2006/0195461 A1 | 8/2006 | Lo et al. |
| 2007/0022372 A1 | 1/2007 | Liu et al. |
| 2007/0124325 A1 | 5/2007 | Moore et al. |
| 2007/0156627 A1 | 7/2007 | D'Alicandro |
| 2007/0156643 A1 | 7/2007 | Sareen et al. |
| 2007/0168278 A1 | 7/2007 | Peterson et al. |
| 2007/0168378 A1 | 7/2007 | Sareen et al. |
| 2007/0245223 A1 | 10/2007 | Siedzik et al. |
| 2007/0245229 A1 | 10/2007 | Siedzik et al. |
| 2008/0115048 A1 | 5/2008 | Veselova et al. |
| 2008/0115069 A1 | 5/2008 | Veselova et al. |

FOREIGN PATENT DOCUMENTS

| | | |
|---|---|---|
| EP | 0986011 A2 | 3/2000 |
| EP | 1223503 | 7/2002 |
| EP | 1376337 | 2/2004 |
| EP | 1630694 A2 | 3/2006 |
| GB | 2391148 | 1/2004 |
| JP | 2001265753 | 9/2001 |
| WO | WO 9800787 A1 | 8/1998 |
| WO | WO 2004038548 A2 | 5/2004 |
| WO | WO 2004038548 A3 | 5/2004 |
| WO | WO 2004038548 R4 | 5/2004 |
| WO | WO 2004086254 A1 | 10/2004 |
| WO | WO2005/001709 A2 | 1/2005 |
| WO | WO 2005067328 A1 | 7/2005 |
| WO | WO 2005110010 A2 | 11/2005 |
| WO | WO 2005/001709 A2 | 7/2007 |
| WO | WO 2007081783 A2 | 7/2007 |

OTHER PUBLICATIONS

U.S. Appl. No. 10/420,621, filed Apr. 22, 2003, entitled "Creation and Recognition of Specially-Marked Items in Notes".
U.S. Appl. No. 10/387,287, filed Mar. 12, 2003, entitled "System and Method for Customizing Note Flags".
U.S. Appl. No. 10/664,740, filed Sep. 18, 2003, entitled "Method and System for Providing Data Reference Information".
U.S. Appl. No. 10/955,232, filed Sep. 30, 2004, entitled "Method and System for Improved Electronic Task Flagging and Management".
U.S. Official Action mailed Sep. 23, 2005 in U.S. Appl. No. 10/420,621.
U.S. Official Action mailed Mar. 6, 2006 in U.S. Appl. No. 10/664,740.
Microsoft Corporation, "Microsoft Snipping Tool for Tablet PC Preview Release Help: Capturing Clips: Capturing Regions: Displaying or Hiding Links", Nov. 2002, 4 pp.
Leszynski Group. "News Story: Leszynski Group Powers Bill Gates' Tablet PC Launch Keynote", Nov. 2002, 1 pp.
Leszynski Group, "Tablet PC Solutions", Nov. 2002, 3 pp.
IBM Corporation, "Dragging Marked Data to an Editor Window", Technical Disclosure Bulletin, Mar. 1992. vol. 34, No. 10B, pp. 202-203.
IBM Corporation, "Source Dimension Copying Using the Standard Clipboard". Technical Disclosure Bulletin. Aug. 1994, vol. 37, No. 8, pp. 419-420.
IBM Corporation. "Multiple Item On-Line Clipboard", Technical Disclosure Bulletin, Jul. 1992. No. 2, pp. 425.
Apperley, M. et al., "Breaking the Copy/Paste Cycle: The Stretchable Selection Tool", Computer Science Department, New Zealand, Feb. 2000, pp. 1-8.
U.S. Official Action dated Jun. 13, 2006 in U.S. Appl. No. 10/420,621.
U.S. Official Action mailed Oct. 24, 2006 in U.S. Appl. No. 10/664,740.
U.S. Official Action mailed Jun. 12, 2006 in U.S. Appl. No. 10/387,287.
U.S. Official Action mailed Feb. 2, 2007 in U.S. Appl. No. 10/387,287.
U.S. Official Action mailed Jan. 7, 2008 in U.S. Appl. No. 11/063,309.
Rich, Charles and Sidner, Candace L., "Segmented Interaction History in a Collaborative Interface Agent," 1997 ACM, pp. 23-30.
Dwelly, Andrew, "Functions and Dynamic User Interfaces," 1989 ACM, pp. 371-381.
Wavefront, Alias I., "The Hotbox: Efficient Access to a Large Number of Menu-Items," ACM 1999, pp. 231-237.
Rich, Charles and Sidner, Candace L., "Adding a Collaborative Agent to Graphical User Interfaces," 1996 ACM, pp. 21-30.
Boyce, Jim, "Microsoft Outlook Inside Out," 2001, Redmond, Washington, pp. 67, 68, 109, 110, 230, 231, 310, 316-318, 798.

Halvorson, Michael and Young, Michael, "Microsoft Office XP Inside Out," 2001, Redmond, Washington, pp. 1005-1009, 1015, 1023-1028, 1036-1039, 1093.
Riggsby, Matt et al., "Mastering Lotus Notes and Domino 6," 2003, Alameda, California, pp. 135-139.
Riggsby, Matt et al., "Mastering Lotus Notes and Domino 6," 2003, Alameda, California, pp. 135-138, 607-612.
"Primary Windows," date unknown (printed Feb. 23, 2007, 23 pages).
Schumaker, Dennis, "User Interface Standards," Sep. 2001, 5 pages.
Budinsky, F. et al., "WebSphere Studio Overview," May 6, 2004, 25 pages.
U.S. Official Action mailed Feb. 20, 2007 in U.S. Appl. No. 10/420,621.
Padwick, Gordon, Ebook titled "Special Edition Using Microsoft Outlook 2002", published May 17, 2001, pp. 1-7.
"Evermore Integrated Office if the 'First REAL Office'", Evermore Software Ltd., 2001-2004, retrieved Jan. 24, 2007, 2 pp.
Young et al., "Microsoft Office System Inside Out: 2003 Edition", published Sep. 10, 2003, pp. 1-168.
"Setting Reminders in Outlook", California Lutheran University Information Systems and Services, Nov. 2005, 3 pp.
Slovak, Ken, "Absolute Beginner's Guide to Microsoft Office Outlook 2003", Que, Oct. 1, 2003; Chapter 1: Personal Information Management, Chapter 2: Working in Outlook's User Interface, Chapter 4: Flagging E-Mails and E-Mail Reminders, Chapter 7, Chapter 12: Using Advanced Find, 6 pp.
Gnome 2.8 Desktop User Guide, Sun Gnome Documentation Team, 2004, 67 pp.
Braun, Owen, "Owen Braun: OneNote 12: Linking related notes together (really)", Date: Oct. 6, 2005, 2 pp.
Braun, Owen, "Owen Braun: OneNote 12: New Extensibility in One Note 12", Date: Oct. 6, 2005, 2 pp.
"SOHO Notes Tour: Note-Taking", Date Unknown, 3 pp.
Henzinger, Monica, "Link Analysis in Web Information Retrieval", Date: 2000, 6 pp.
"Accessibility Essentials 2 Authoring Accessible Documents—Inserting Hyperlinks: Linking internally within a document", Date Unknown, 4 pp.
"Tomboy: Simple Note Taking", Date: 2004-2006, 4 pp.
U.S. Official Action mailed Jul. 13, 2007 in U.S. Appl. No. 10/664,740 19 pp.
U.S. Official Action mailed Jul. 16, 2007 in U.S. Appl. No. 10/063,309 19 pp.
U.S. Official Action mailed Oct. 19, 2007 in U.S. Appl. No. 10/387,287 10 pp.
U.S. Official Action mailed Nov. 5, 2007 in U.S. Appl. No. 10/420,621 11 pp.
U.S. Official Action mailed Mar. 10, 2008 in U.S. Appl. No. 10/955,232 17 pp.
U.S. Official Action mailed Feb. 21, 2008 in U.S. Appl. No. 11/326,110 55 pp.
U.S. Official Action mailed Mar. 5, 2008 in U.S. Appl. No. 11/326,583 102 pp.
U.S. Official Action mailed Jul. 9, 2008 in U.S. Appl. No. 10/387,287 15 pp.
Kraynak, Joe "Absolute Beginner's Guide to Microsoft Office Excel 2003", Que., Sep. 2003, 14 pp.
Baker, Richard, "Microsoft Offie 2004 for Mac in a Snap", Sams, Aug. 2004, 17 pp.
U.S. Official Action mailed Nov. 12, 2008 in U.S. Appl. No. 10/955,232, 14 pp.
U.S. Official Action mailed Nov. 17, 2008 in U.S. Appl. No. 11/326,110. 39 pp.
PCT Search Report mailed Jun. 22, 2007, in PCT/US2007/000248, 8 pp.
PCT Search Report mailed Jun. 22, 2007, in PCT/US2007/000244, 8 pp.
Chinese First Office Action mailed Oct. 31, 2008 in 200510088531.1, 7 pp.
U.S. Official Action mailed Dec. 10, 2008 in U.S. Appl. No. 11/326,583, 27 pp.
U.S. Official Action mailed Dec. 24, 2008 in U.S. Appl. No. 10/460,621, 25 pp.
European Search Report mailed Jan. 30, 2009 in 07717882.0-1527/1977340.
European Search Report mailed Jan. 30, 2009 in 007717837.4-1527/1977339.
U.S. Official Action mailed Mar. 13, 2009 in U.S. Appl. No. 10/955,232.
U.S. Official Action mailed Mar. 18, 2009 in U.S. Appl. No. 10/387,287.
Michael J. Young: "Microsoft Office 2003 Eitions, Product Guide", Internet Publication, Sep. 2003, 168 pp.
U.S. Official Action mailed May 20, 2009 in U.S. Appl. No. 11/599,598.
U.S. Official Action mailed May 21, 2009 in U.S. Appl. No. 11/326,583, pp. 1-24.
U.S. Official Action mailed Jun. 11, 2009 in U.S. Appl. No. 11/599,626, pp. 1-21.
U.S. Official Action mailed Jun. 15, 2009 in U.S. Appl. No. 10,420,621, pp. 1-17.
European Examination Report mailed Apr. 1, 2009 in 07717837.4-1527/1977339, pp. 1-8.
European Examination Report mailed Mar. 25, 2009 in 07717882.0-1527/1977340, pp. 1-5.
Mexican Official Action dated Feb. 20, 2009 in PA/a/2005/007147—English Translation Only, pp. 1-3.
U.S. Official Action mailed Jun. 18, 2007 in U.S. Appl. No. 10/954,954, pp. 1-30.
U.S. Official Action mailed Mar. 18, 2008 in U.S. Appl. No. 10/954,954, pp. 1-17.
Chinese Second Office Action dated Jul. 10, 2009 in 200510088531.1, pp. 1-8.
Khare et al., "The Origin of (Document) Species," University of California, 1998, pp. 1-9.
"Separate Structure and Presentation," Aug. 20, 1998, pp. 1-4.
"The Style Attribute and CSS Declarations," Aug. 20, 1998, pp. 1-4.
"What's Hot in Internet Services?", Aug. 20, 1998, pp. 1-3.
"The Style Element & CSS Selectors," Aug. 20, 1998, pp. 1-3.
"The STYLE Element & CSS Selectors", Aug. 20, 1998, pp. 1-3.
"ID & Class Selectors, Pseudoclasses," Aug. 20, 1998, pp. 1-3.
"ID & Class Selectors, Pseudoclasses", Aug. 20, 1998, pp. 1-3.
"ID & Class Selectors, Pseudoclasses", Aug. 20, 1998, pp. 1-2.
"External Style Sheets," Aug. 20, 1998, pp. 1-3.
Raman, "Cascaded Speech Style Sheets," 1997, pp. 1-7.
Hopkins, "The Design and Implementation of Pie Menu", Originally published in Dr. Dobb's Journal, 1991, pp. 1-7.
Lewis, "Easy Microsoft Office 2003", Sep. 2003, 10 pp.
Microsoft Press, "Microsoft Windows User Experience", 1999, pp. 51-52.
Long, Jr., et al., "A Prototype User Interface for A Mobile Multimedia Terminal," Department of Electrical Engineering and Computer Sciences, The University of California at Berkeley, Berkeley, CA. retrieved Jan. 10, 2006, 4 pp.
Landay, et al., "NotePals: Sharing and Synchronizing Handwritten Notes with Multimedia Documents," EECS Department, University of California, Berkeley, CA, retrieved Jan. 10, 2006, 8 pp.
Singh, et al., "Collaborative Note Taking Using PDAs" Department of Computer Science, Naval Postgraduate School, Monterey, CA - 2005, pp. 835-848.
Weverka, Microsoft Office OneNote 2003, Step by Step, Microsoft Press, Jul. 13, 2004, pp. 1-64.
Harter, et al., A Distributed Location System for the Active Office, IEEE Network, 1994, pp. 62-70.
Chen, et al., A Survey of Context-Aware Mobile Computing Research, Dartmouth Computer Science Technical Report, 2000, 16 pages.
Schilit, A System Architecture for Context-Aware Mobile Computing, Columbia University, 1995, 153 pages.
Spreitzer, et al., Providing Location Information in a Ubiquitous Computing Environment, SIGOPS '93, 1993, pp. 270-283.
Theimer, et al., Operating System Issues for PDAs, in Fourth Workshop on Workstation Operating Systems, 1993, 7 pages.
Want, Active Badges and Personal Interactive Computing Objects, IEEE Transactions on Consumer Electronics, 1992, 11 pages, vol. 38 - No. 1.

Schilit, et al., The ParcTab Mobile Computing System, IEEE WWOS-IV, 1993, 4 pages.

Schilit, et al., Context-Aware Computing Applications, in Proceedings of the Workshop on Mobile Computing Systems and Applications, Dec. 1994. pp. 85-90.

Schilit, et al., Customizing Mobile Applications, Proceedings USENIX Symposium on Mobile and Location Independent Computing, Aug. 1993, 9 pages.

Spreitzer, et al., Architectural Considerations for Scalable, Secure, Mobile Computing with Location Information, In The 14th International Conference on Distributed Computing Systems, Jun. 1994, pp. 29-38.

Spreitzer et al., Scalable, Secure, Mobile Computing with Location Information, Communications of the ACM, Jul. 1993, 1 page, vol. 36 - No. 7.

Want, et al., The Active Badge Location System, ACM Transactions on Information Systems, Jan. 1992, pp. 91-102, vol. 10 - No. 1.

Weiser, Some Computer Science Issues in Ubiquitous Computing, Communications of the ACM, Jul. 1993, pp. 75-84, vol. 36 - No. 7.

Billinghurst, et al., An Evaluation of Wearable Information Spaces, Proceedings of the Virtual Reality Annual International Symposium, 1998, 8 pages.

Rhodes, Remembrance Agent: A continuously running automated information retrieval system, The Proceedings of The First International Conference on The Practical Application of Intelligent Agents and Multi Agent Technology, 1996, pp. 487-495.

Horvitz, et al., In Pursuit of Effective Handsfree Decision Support: Coupling Bayesian Inference, Speech Understanding, and User Models, 1995, 8 pages.

Rhodes, The Wearable Remembrance Agent: A System for Augmented Theory, The Proceedings of The First International Symposium on Wearable Computers, Oct. 1997, pp. 123-128.

Horvitz, et al., Attention-Sensitive Alerting in Computing Systems, Microsoft Research, Aug. 1999.

Schilit, et al., Disseminationg Active Map Information to Mobile Hosts, IEEE Network, 1994, pp. 22-32, vol. 8 - No. 5.

Billinghurst, et al., Wearable Devices: New Ways to Manage Information, IEEE Computer Society, Jan. 1999, pp. 57-64.

Starner, Wearable Computing and Contextual Awareness, Massachusetts Institute of Technology, Jun. 1999, 248 pages.

Rhodes, The Wearable Remembrance Agent: A System for Augmented Memory, Personal Technologies Journal Special Issue on Wearable Computing, 1997, 12 pages.

Workshop on Wearable Computing Systems, Aug. 19-21, 1996.

Billinghurst, Research Directions in Wearable Computing, University of Washington, May, 1998, 48 pages.

Weiser, The Computer for the 21st Century, Scientific American, Sep. 1991, 8 pages.

Joachims, Text categorization with support vector machines: learning with many relevant features, Machine Learning, European Conference on Machine Learning, Apr. 21, 1998, pp. 137-142.

International Search Report dated Sep. 29, 2003 for PCT Application Serial No. 00/20685, 3 Pages.

Losee, Jr., Minimizing information overload: the ranking of electronic messages, Journal of Information Science 15, Elsevier Science Publishers B.V., 1989, pp. 179-189.

U.S. Official Action mailed Oct. 28, 2008 in U.S. Appl. No. 10/954,954, pp. 1-17.

U.S. Official Action mailed Dec. 11, 2008 in U.S. Appl. No. 11/405,251, pp. 1-25.

U.S. Official Action mailed Jun. 11, 2009 in U.S. Appl. No. 11/405,256, pp. 1-22.

U.S. Official Action mailed Jul. 17, 2009 in U.S. Appl. No. 11/405,251, pp. 1-23.

U.S. Official Action mailed Aug. 7, 2009 in U.S. Appl. No. 11/326,110, pp. 1-14.

PCT Search Report dated Aug. 27, 2007 in PCT/US2007/007233, pp. 1-10.

PCT Search Report dated Sep. 21, 2007 in PCT/US2007/007231, pp. 1-13.

European Examination Report dated Mar. 25, 2009 in 07717882.0-1527/1977340, pp. 1-5.

European Examination Report dated Apr. 1, 2009 in 07717837.4-1527/1977339, pp. 1-8.

European Examination dated Oct. 6, 2009 in 07717882.0-1527, pp. 1-4.

European Examination dated Oct. 6, 2009 in 07717837.4-1527, pp. 1-3.

Russian Office Action dated Jun. 15, 2009 in 2005120371, pp. 1-8.

U. S. Official Action mailed Oct. 19, 2009 in U.S. Appl. No. 11/599,598, pp. 1-14.

U. S. Official Action mailed Oct. 14, 2009 in U.S. Appl. No. 11/955,232, pp. 1-24.

Chinese First Office Action dated Oct. 30, 2009 in 200780001988.1, pp. 1-21.

Kamel et al., "Retrieving Electronic Ink by Content", Multimedia Database Management Systems, 1996., Proceedings of International Workshop on Aug. 14-16, 1996 pp. 54-61.

* cited by examiner

SYSTEM AND METHOD FOR LINKING PAGE CONTENT WITH A MEDIA FILE AND DISPLAYING THE LINKS

TECHNICAL FIELD

A present invention relates to creating page content in electronic documents through typewritten text or handwritten text, and more specifically, it relates to creating page content and linking this page content with a media file such as an audio file.

BACKGROUND OF THE INVENTION

One of the simplest methods of recording and communicating information is the traditional method of writing the information down on a piece of paper with a writing instrument such as a pen. Writing information by hand on a piece of paper is inexpensive and can be done quickly and easily with little preparation. The traditional method is also flexible in that a writer can generally write in any format anywhere on the page. One of the limitations with handwritten work is that it is not easily manipulated or transferred to other contexts. In other words, changing or transferring a piece of handwritten text typically requires rewriting the text on another medium.

Handwritten notes are often rewritten with personal computers. Specifically, with the widespread use of personal computers, textual information often is recorded using word processing software running on a personal computer. The advantage of such electronic methods for recording information is that the information can be easily stored and transferred to other remote computing devices and electronic media. Such electronically recorded text can also be easily corrected, modified, and manipulated in a variety of different ways.

Typical computer systems, especially computer systems using graphical user interface (GUI) systems such as Microsoft WINDOWS, are optimized for accepting user input from one or more discrete input devices. Common input devices include a keyboard for entering text and a pointing device, such as a mouse with one or more buttons, for controlling the user interface. The keyboard and mouse interface facilitates creation and modification of electronic documents including text, spreadsheets, database fields, drawings, and photos.

One of the limitations with conventional GUI systems of computers is that a user must generally type the text they are entering into the personal computer using the keyboard. Entering text using a keyboard is generally slower and more cumbersome than handwriting. Although recent advances have been made in reducing the size of personal computers, they are still not as portable and easily accessible as traditional paper and pen. Furthermore, traditional pen and paper provide the user with considerable flexibility for editing a document, writing notes in the margin, and drawing figures and shapes. In some instances, a user may prefer to use a pen to mark-up a document rather than review the document on-screen because of the ability to freely make notes outside of the confines of the keyboard and mouse interface.

To address the shortcomings of traditional keyboard and mouse interfaces, there have been various attempts to create an electronic tablet that can record handwriting. Such electronic tablets typically comprise a screen and a handheld device that is similar to a pen (also referred to as a stylus). A user can manipulate the pen to write on the electronic tablet in a manner similar to the use of traditional pen and paper. The electronic tablet can "read" the strokes of the user's handwriting with the handheld device and render the handwriting in electronic form on the tablet's screen and/or the computer's display as "electronic ink". This electronic tablet approach can be employed in a variety of ways including, on a personal computer and on a handheld computing device.

While the electronic tablet approach has overcome many of the shortcomings of traditional keyboard and mouse interfaces, the electronic tablet approach has not overcome some of the problems often associated with conventional handwritten techniques that employ pen and paper. For example, when handwritten notes are taken during a meeting by a user, the information being presented during the meeting may be conveyed beyond the speed of the user in order to take accurate and reliable notes. When information during a meeting is being presented beyond the speed of the user, valuable or important information may not be captured in the notes taken by the user.

Another problem with the electronic tablet approach that is common with conventional handwriting techniques is a user may not comprehend the information being presented during a meeting, a lecture, or other type of presentation because the user may be too focused on taking notes instead of listening and comprehending the information or material being presented. Another problem that the electronic tablet approach shares with conventional handwriting techniques is that notes are often personalized to the user and sometimes may not make sense to another user who did not make the notes. In other words, notes can be of such a personal nature that people other than a user taking the notes may not understand the notes when reading them.

An additional problem that the electronic tablet approach shares with the conventional handwritten techniques is both technologies are not very helpful when a user taking notes does not understand the information or material being presented. In such circumstances, a user may not be able to capture any information by note taking since the user does not understand any of the material being presented.

A further problem shared by the electronic tablet approach and conventional handwriting techniques is in some circumstances a user may not be permitted to read his or her notes while creating them. For example, during a job interview, an employer conducting an interview with a potential employee may miss important body language of the potential employee if the employer did not maintain eye contact with the potential employee. In such circumstances, the user or employer may not be able to capture the substance of the interview with handwriting techniques because eye contact must be maintained. Another problem occurs when reviewing notes. The context of a meeting or class is often forgotten when reviewing handwritten or typed notes.

In order to address some of the problems mentioned above, a user can capture information being presented by combining handwritten note taking techniques and using a media recorder such as an audio recorder or an audio/visual recorder. While recording information with a media device does preserve the entire contents of the information being presented to a user, conventional technology does not provide a way to connect handwritten notes with the medium used to record the information.

In other words, conventional technology does not provide any links between handwritten materials and the media recorder such that a user can easily navigate between information captured with handwriting and information captured with the media recorder. Often, when using a media recorder, a user must listen or view the captured information with a media player and stop, start, rewind, and fast forward through portions of a media file in order to synchronize the written word with the recorded word.

Accordingly, there is a need in the art for a method and system for linking page content with a media file such that a user can easily navigate between the page content and the media file as necessary. There is also a need in the art for a method and system for linking page content with a media file where visual indicators are provided to allow a user to see the connection between the written word and the recorded spoken word in a media file. A further need exists in the art for a method and system that can link page content with a media file such that a user can point to page content and the corresponding recorded medium would be synchronized with the selected written material. In other words, there is a need in the art for visually displaying a link that informs when the notes were taken during the course of a meeting or lecture.

SUMMARY OF THE INVENTION

The present invention can comprise a method and system for linking and displaying page content with a media file. In other words, the present invention can link notes stored in an electronic document with media such as audio stored in an audio file. As media is played back from the media file, the present invention can display visual indicators adjacent to or over page content so that a user can see how page content relates to the media file.

According to one exemplary aspect of the present invention, page content can be highlighted when the page content has a relationship with the media that is being played. That is, page content can be highlighted at different times as the recorded live information from a media file such as audio from an audio file is being played back. For example, if audio information is recorded while a user is taking notes, then during play back of the audio file, the notes derived from parts of the audio content can be highlighted and then un-highlighted as the playback from the audio file progresses.

The present invention can link page content of an electronic document with a media file by using a media link. A media link can comprise a time stamp and a global universal identifier (GUID) that tracks a media file that can be generated simultaneously with page content. The page content can be created by a user in response to visual, audio, or audio visual information being presented that is stored in the media file. The time stamp can be produced by a media recorder/player as information is being stored on or played back from a media file.

According to one exemplary aspect of the present invention, the media recorder/player can comprise an audio recorder/player that uses audio files. However, other media recorders/players such as video and audio/visual player/recorders such as video cameras are not beyond the scope and spirit of the present invention.

To display the connection or link between page content and a media file, the present invention can build an index that comprises media links that were stored adjacent to page content in document files. A document editor supporting the visual link between the page content and media can produce the index prior to displaying the visual links. The index can be used to determine which portions of the page content stored in the document files should be highlighted at specific times during playback of the media from the media file.

The present invention can also employ a set of rules to follow when displaying visual links corresponding to play back of a media file. This set of rules can prevent random navigation through an electronic document for notes that may be recorded out of sequence relative to other notes and where such random notes may not be essential for display to the user during play back of a media file. Generally, the present invention can be designed to display a majority of media links in a logical and sequential fashion so that a user is not confused if random notes were taken out of sequence such as on different or earlier pages that may have been displayed during a visual presentation of the links to the media file by a document editing program.

DETAILED DESCRIPTION OF EXEMPLARY EMBODIMENT

The present invention can link page content with a media file and display these links during playback. In other words, the present invention can link notes stored in an electronic document with media such as audio information stored in an audio file. As media is played back from the media file, the present invention can display visual indicators adjacent to or over page content so that a user can see how page content relates to the media file.

Exemplary Operating Environment

Figure 1:
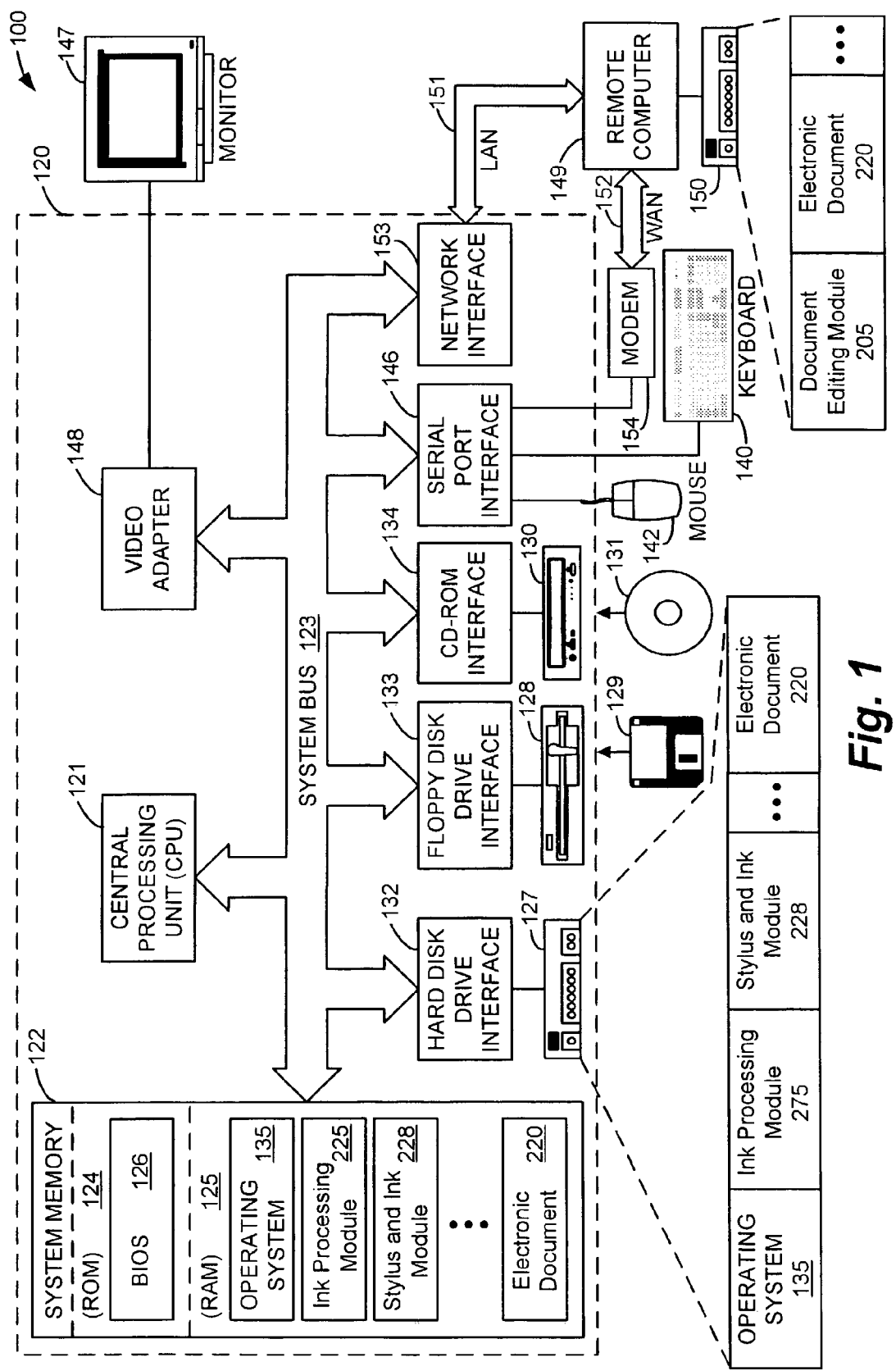
FIG. 1 is a block diagram illustrating an exemplary operating environment for implementing various embodiment of the present invention.

Exemplary embodiments of the present invention will hereinafter be described with reference to the drawings, in which like numerals represent like elements throughout the several figures. FIG. 1 illustrates an exemplary operating environment for implementation of the present invention.

The exemplary operating environment includes a general-purpose computing device in the form of a conventional personal computer 120. Generally, the personal computer 120 includes a processing unit 121, a system memory 122, and a system bus 123 that couples various system components including the system memory 122 to the processing unit 121. The system bus 123 may be any of several types of bus structures including a memory bus or memory controller, a peripheral bus, and a local bus using any of a variety of bus architectures. The system memory includes a read-only memory (ROM) 124 and a random access memory (RAM) 125. A basic input/output system (BIOS) 126, containing the basic routines that help to transfer information between elements within personal computer 120, such as during start-up, is stored in ROM 124.

Personal computer 120 further includes a hard disk drive 127 for reading from and writing to a hard disk, not shown, a magnetic disk drive 128 for reading from or writing to a removable magnetic disk 129, and an optical disk drive 130 for reading from or writing to a removable optical disk 131 such as a CD-ROM or other optical media. Hard disk drive 127, magnetic disk drive 128, and optical disk drive 130 are connected to system bus 123 by a hard disk drive interface 132, a magnetic disk drive interface 133, and an optical disk drive interface 134, respectively.

Although the exemplary environment described herein employs hard disk 127, removable magnetic disk 129, and removable optical disk 131, it should be appreciated by those skilled in the art that other types of computer readable media which can store data that is accessible by a computer, such as magnetic cassettes, flash memory cards, digital video disks, Bernoulli cartridges, RAMs, ROMs, and the like, may also be used in the exemplary operating environment. The drives and their associated computer readable media provide nonvolatile storage of computer-executable instructions, data structures, program modules, and other data for personal computer 120.

A number of program modules may be stored on hard disk 127, magnetic disk 129, optical disk 131, ROM 124, or RAM 125, including an operating system 135, an ink processing module 225, a stylus and ink module 228, and an electronic document 220. Program modules include routines, sub-routines, programs, objects, components, data structures, etc., which perform particular tasks or implement particular abstract data types. Aspects of the present invention may be implemented in the form of an ink processing module 225 that can operate in concert with a stylus and ink module 228 to edit an electronic document 220.

A user may enter commands and information into personal computer 120 through input devices, such as a keyboard 140 and a pointing device 142. Pointing devices may include a mouse, a trackball, and an electronic pen that can be used in conjunction with an electronic tablet. Other input devices (not shown) may include a microphone, joystick, game pad, satellite dish, scanner, or the like. These and other input devices are often connected to processing unit 122 through a serial port interface 146 that is coupled to the system bus 123, but may be connected by other interfaces, such as a parallel port, game port, a universal serial bus (USB), or the like. A display device 147 may also be connected to system bus 123 via an interface, such as a video adapter 148. In addition to the monitor, personal computers typically include other peripheral output devices (not shown), such as speakers and printers.

The personal computer 120 may operate in a networked environment using logical connections to one or more remote computers 149. Remote computer 149 may be another personal computer, a server, a client, a router, a network PC, a peer device, or other common network node. While a remote computer 149 typically includes many or all of the elements described above relative to the personal computer 120, only a memory storage device 150 has been illustrated in the Figure. The logical connections depicted in the Figure include a local area network (LAN) 151 and a wide area network (WAN) 152. Such networking environments are commonplace in offices, enterprise-wide computer networks, intranets, and the Internet.

When used in a LAN networking environment, the personal computer 120 is often connected to the local area network 151 through a network interface or adapter 153. When used in a WAN networking environment, the personal computer 120 typically includes a modem 154 or other means for establishing communications over WAN 152, such as the Internet. Modem 154, which may be internal or external, is connected to system bus 123 via serial port interface 146. In a networked environment, program modules depicted relative to personal computer 120, or portions thereof, may be stored in the remote memory storage device 150. It will be appreciated that the network connections shown are exemplary and other means of establishing a communications link between the computers may be used.

Moreover, those skilled in the art will appreciate that the present invention may be implemented in other computer system configurations, including hand-held devices, multiprocessor systems, microprocessor based or programmable consumer electronics, network person computers, minicomputers, mainframe computers, and the like. The invention may also be practiced in distributed computing environments, where tasks are performed by remote processing devices that are linked through a communications network. In a distributed computing environment, program modules may be located in both local and remote memory storage devices.

Figure 2:
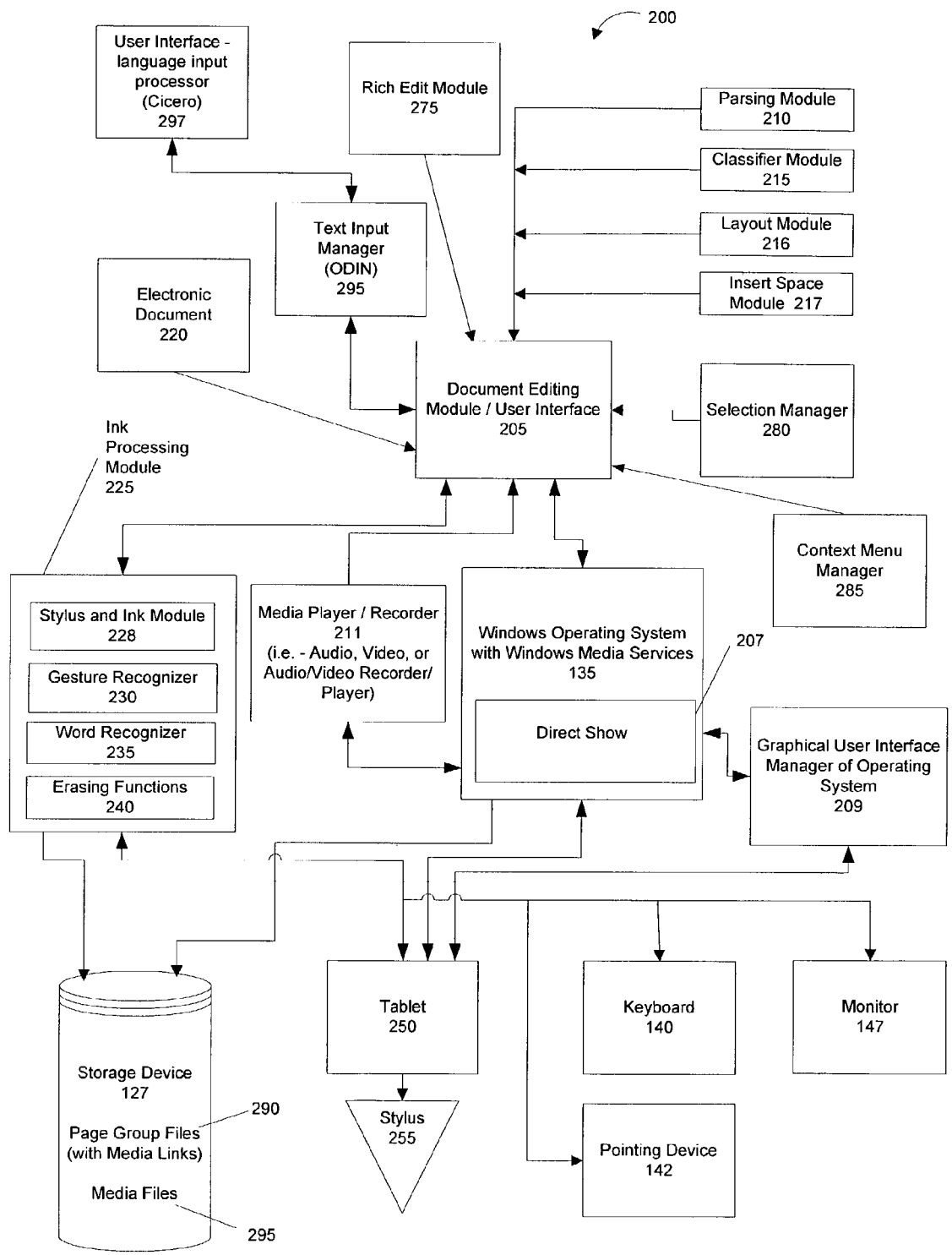
FIG. 2 is a block diagram depicting primary functional components of an exemplary free-form document editor and related input devices used to create notes.

Referring to FIG. 2, an exemplary architecture 200 is illustrated for editing electronic ink in accordance with an embodiment of the present invention. FIG. 2 shows typical hardware and software components used in operating the invention from a functional perspective. Conventional input devices are represented by the keyboard 260 and the pointing device (mouse) 265. A user can enter commands and information into the computer 120 using the input devices. Other input devices (not shown) may include a microphone, joystick, game pad, satellite dish, and scanner.

A conventional output device, such as monitor 270, is used to display information from the computer 120. Other output devices (not shown) can include a printer or speaker. Other hardware components shown in FIG. 2 include an electronic tablet 250 and an accompanying stylus 255. The tablet 250 and stylus 255 are used to input handwriting strokes which are converted to collections of data that can be represented as electronic ink. The electronic ink may be incorporated into an electronic document 220 and may be displayed on either the electronic tablet 250, the monitor 270, or both.

Although the electronic tablet 250 and the monitor 270 are illustrated as being distinct, in the preferred embodiment they are either coupled or form a single component. The joint tablet/monitor component has the ability to display information and receive input from the stylus 255. Also shown among the hardware components is a conventional electronic storage device such as a hard drive 127 or RAM 125.

In the representative architecture 200, all of the hardware components are coupled to an ink processing software module 225. It should be understood by those skilled in the art that FIG. 2 is merely representative and that in practice the hardware components typically are coupled to the elements shown in FIG. 1. The ink processing module 225 is operable for receiving data from the electronic tablet 250 and/or the stylus 255 and rendering that data as electronic ink. In the preferred and exemplary embodiment, the ink processing module 225 is a collection of software modules that perform different tasks for rendering handwriting strokes as electronic ink.

For example, the stylus and ink module 228 can receive data describing the positions and angles of the stylus for a series of handwriting strokes. The stylus and ink module 228 can interpret the data for rendering electronic ink. Other software modules, such as a gesture recognizer 230 and word recognizer 235 can be designed to identify certain handwriting strokes and assign them a particular significance. For example, certain gestures such as a cross-out may be recognized and associated with other editing processes. The ink processing module 225 can also include an erasing functions module 240 for removing electronic ink that has been previously rendered.

Although ink processing modules are known in the art and necessary for an electronic tablet to function, what is needed is a document editing module 205, such as the one shown in FIG. 2, that enhances the performance of an electronic tablet. Specifically, document editing module 205 facilitates the manipulation of electronic ink so that a user can create and manipulate an electronic document 220 with greater ease and sophistication.

The document editing module 205 communicates with the windows media services of the windows operating system 135. The document editing module 205 can control the operation of the media player/recorder 211 through issuing commands to the windows media services. In turn, the windows media services of the windows operating system 135 as well as the direct show module 207 communicate with the media player/recorder 211 in order to control the operation thereof.

The media player/recorder 211 can communicate to the document editing module 205. The media/player recorder 211 can comprise an audio player/recorder, a video player/recorder, or an audio visual player/recorder, or other like media capturing devices. The media player/recorder 211 typically communicates time stamps to the document editing module 205 as needed by the document editing module. The windows media services of the windows operating system 135 can format and store the live event information received from the media player/recorder 211. Similarly, the document editing module 205 can format and store the page group files of the electronic document 220 on the storage medium 127.

The page group files 290 and the audio files 295 can be both stored on the same storage medium 127. And in one exemplary embodiment, the page group files 290 and the audio files 295 are stored within close proximity to one another in an exemplary file architecture as will be discussed below in further detail with respect to FIGS. 5 and 6.

The document editing module 205 may further comprise a collection of software modules for controlling and manipulating electronic ink rendered on the monitor 270. For example, a parsing module 210 can be used to identify handwriting strokes that are selected by the user for editing. Selected strokes may by highlighted or shaded to assist the user in identifying which strokes are to be edited. A classifier module 215 can identify certain handwriting strokes as being part of a word or drawing. Software modules such as the layout module 216 and the insert space module 217 can be designed to control how electronic ink is rendered and moved. Other modules can include a selection manager 280, a context menu manager 285, a text input manager 295, and a user interface language input processor 297.

The selection manager 280 can monitor how converted text or electronic ink is selected for editing by the user. The context menu manager 285 can monitor the selection of a list of alternate words that can be displayed when a user edits a word in converted text. The text input manager 295 can operate as an interface for a user interface language input processor 297 that uses language rules to assist in the recognition of words through context.

The modules shown in FIG. 2 are representative and those skilled in the art should understand that other modules may also be part of or coupled to the document editing module 205. For example, the document editing module 205 may also work with a rich edit module 275 that provides added functionality such as monitoring and controlling the selection of text and word wrapping.

The present invention includes multiple computer programs which embodies the functions described herein and illustrated in the exemplary display screens and the appended flow chart. However, it should be apparent that there could be many different ways of implementing the invention in computer programming, and the invention should not be construed as limited to any one set of computer program instructions. Further, a skilled programmer would be able to write such a computer program to implement the disclosed invention without difficulty based on the exemplary display screens and flow charts and associated description in the application text, for example.

Therefore, disclosure of a particular set of program code instructions is not considered necessary for an adequate understanding how to make and use the invention. The inventive functionality of the claimed computer program will be explained in more detail in the following description in conjunction with the remaining Figures illustrating the functions and program flow.

Exemplary Components of the Page Content Media Linking System

Figure 3:
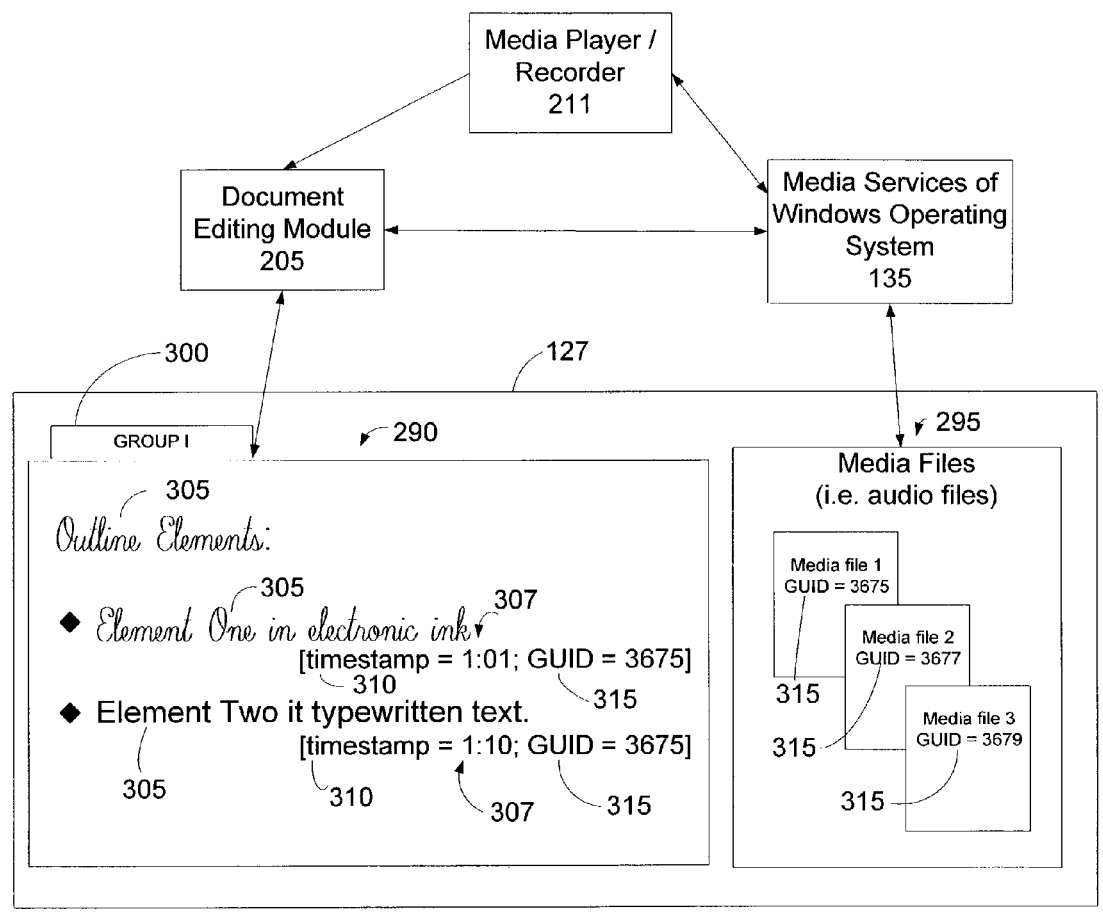
FIG. 3 is a functional block diagram illustrating some additional details of some key components according to one exemplary embodiment of the present invention.

Referring now to FIG. 3, this figure is a functional block diagram illustrating some key components of the media linking system and further details of the files maintained by the document editing module 205 and the media services of the window operating system 135. As noted above, the document editing module 205 can store files 290 comprising page groups 300 while the media services of the windows operating system 135 stores media files 295 on the storage medium 127. The storage medium 127 can comprise a hard disk drive as illustrated in FIG. 1. However those skilled in the art will recognize that page groups 300 and media files 295 could be stored in memory such as random access memory 125. Alternatively, in a web based environment, the client document editing modules 205 and media services of the windows operating system 135 of the client computer could store the page groups 300 and the media files 295 on a server remote from the client document editing module 205. Those skilled in the art will appreciate that other types of storage devices 127 are not beyond the scope and spirit of the present invention.

The page groups 300 can comprise a collection of related electronic pages. For the page group 300 illustrated in FIG. 3, the page group 300 only comprise a single page. Each page of a page group 300 can comprise outline elements 305. Outline elements can comprise, but are not limited to, typed text, electronic ink, drawings, and pasted material from an electronic clip board. Adjacent to each outline element can be a link 307 that can comprise a time stamp 310 and a global unique identifier (GUID) 315 that corresponds to a media file.

The media link 307 is used by the document editing module 205 to identify a specific media file 295 associated with a particular outline element 305 as well as a specific portion of a media file 295 associated with a particular outline element 305. Further details of the media link 307 relative to the outline elements 305 and the audio files 295 will be discussed in further detail below.

Exemplary File System for Page Groups and Media Files

Figure 4:
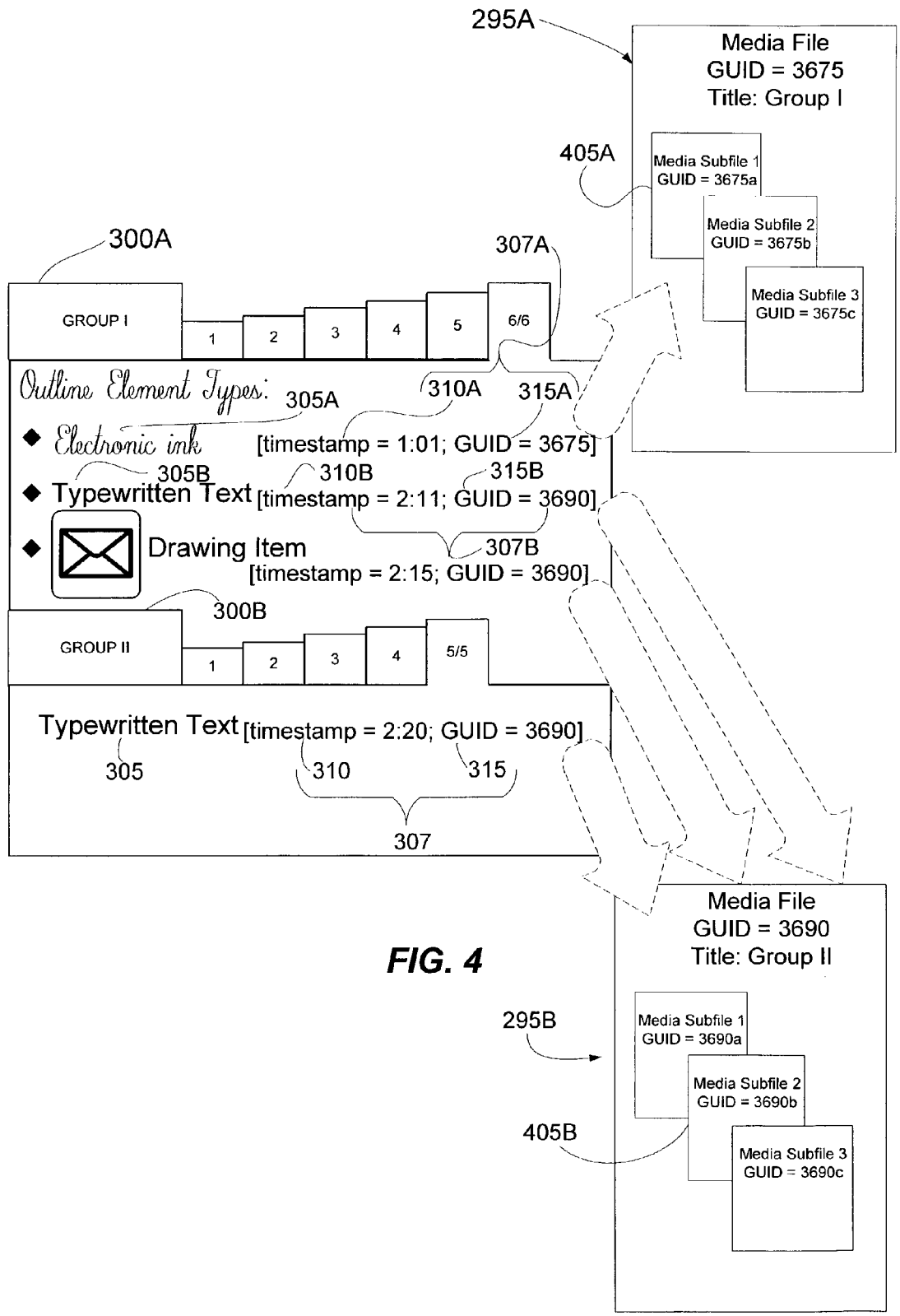
FIG. 4 is a functional block diagram illustrating a relationship between page content files and media files according to one exemplary embodiment of the present invention.

Referring now to FIG. 4, this figure illustrates some exemplary relationships between page groups 300 and media files 295. As noted above, the page group 300 is maintained by the document editing module 205 while the media files 295 are maintained by media services of the windows operating system 135. In FIG. 4, a first page group 300A can comprise 6 pages of page content. Page content of a sixth page of the first page group 300A can comprise a first outline element 305A and a second outline element 305B. The first outline element 305A can comprise electronic ink. Meanwhile the second outline element can comprise typewritten text.

Each page group 300 can comprise any number of pages. And similarly, each media file 295 can comprise any number of media subfiles 405. However, according to a preferred exemplary embodiment of the present invention, each media file 295 only comprises a single file structure without any distinct sub files as known to those of ordinary skill in the art.

The first page group 300A can be assigned to a first media file group 295A. Similarly, a second page group 300B can be assigned to a second media file group 295B. The first outline element 305A can be assigned to a first media link 307A. A first media link 307A can comprise a first time stamp 310A and a first GUID 315A. The first time stamp 310A and first GUID 315A can refer to a first media file 295A and more specifically to a first media subfile 405A.

Similarly, the second outline element 305B can be assigned a second media link 307B. The second media link 307B can comprise a second time stamp 310B and a second GUID 315B. However, the second time stamp 310B and the second GUID 315B can correspond or refer to a second media file group 295B.

This figure demonstrates that each page group 300 is assigned to a single media file 295. However, the page content comprising outline elements 305 can refer to more than one media file 295. This relationship will be more fully explained below with respect to the flow charts discussed in FIGS. 8 through 13.

Exemplary File Architectures

Figure 5:
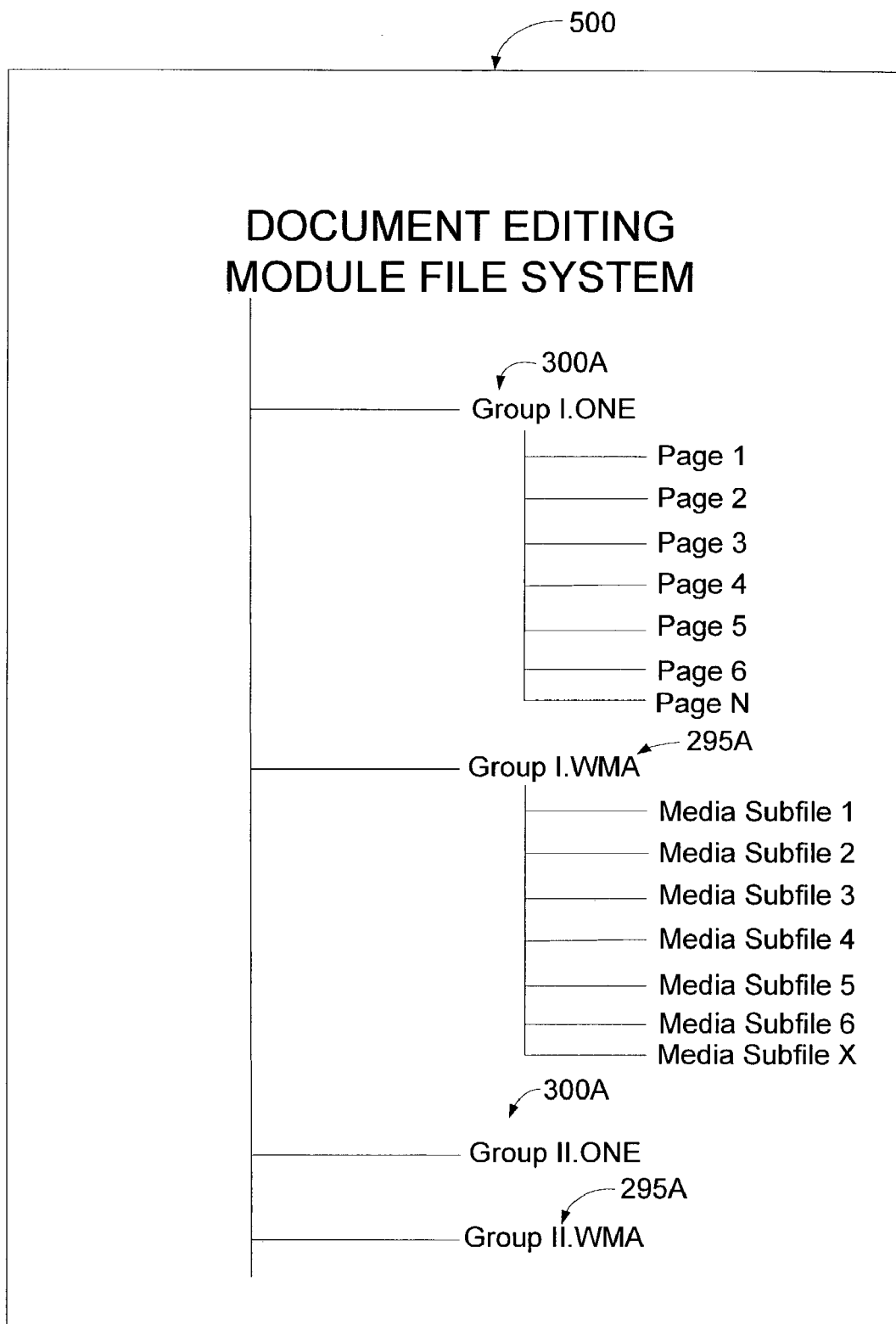
FIG. 5 illustrates an exemplary file architecture where page groups correspond with groups of media files according to one exemplary embodiment of the present invention.

Referring now to FIG. 5, this figure illustrates an exemplary file architecture 500 that can be navigated by a user. The exemplary file architecture 500 can comprise a tree structure where the page group 300 is typically positioned in the tree structure in a manner similar to the media files 295. Also, each media file 295 in one preferred and exemplary embodiment has a file name that corresponds with a corresponding page group name. Such a file naming system allows for easy navigation between page groups 300 and corresponding media files 295.

Figure 6:
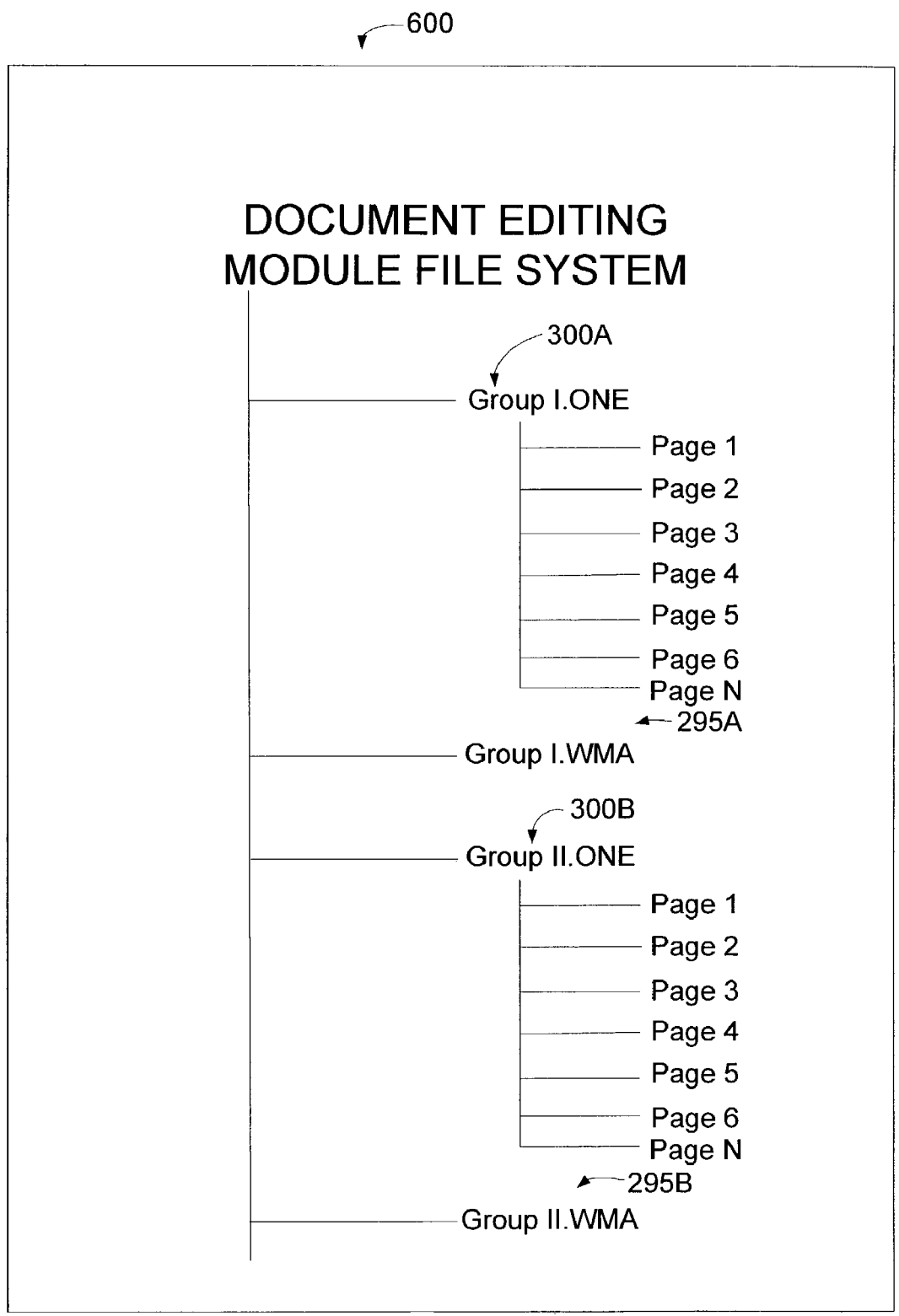
FIG. 6 illustrates an alternate exemplary embodiment of a file architecture where page group files correspond with a single media file according to an alternate exemplary embodiment of the present invention.

Referring now to FIG. 6, this figure illustrates another exemplary file architecture 600 according to an alternative and preferred exemplary embodiment of the present invention. In this particular file architecture 600, each page group 300 corresponds with a single media file 295. In this way, any changes to the pages within a page group 300 would only be reflected in a single audio file 295.

Figure 7A:
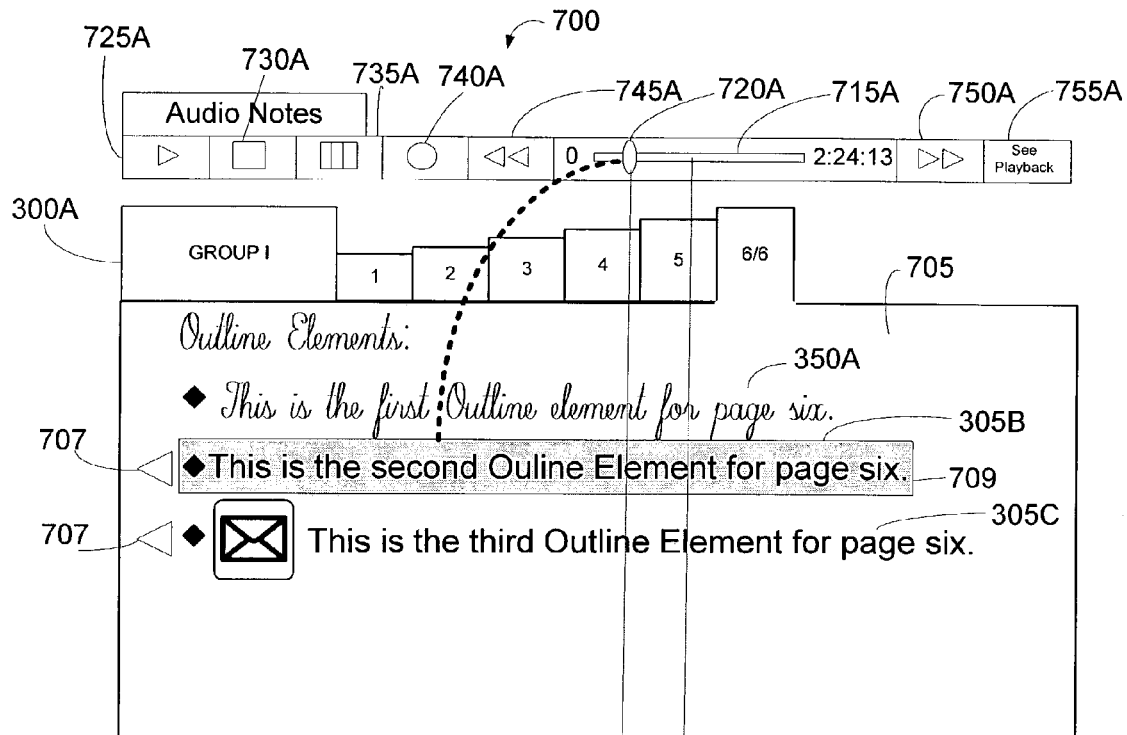
FIGS. 7A-7C are exemplary displays illustrating visual links between a media tool bar and page content according to one exemplary embodiment of the present invention.

Referring now to FIG. 7A, this figure illustrates a visual link between a media tool bar 700 and page content 705 of a page in a page group 300. The page content 705 comprises first, second, and third outline elements 305A, 305B, and 305C. As noted above, the outline elements 305 can comprise any one of typewritten text, handwritten text in the form of electronic ink, a drawing made with electronic ink or material pasted with an electronic clipboard. Other forms of content for the outline elements are not limited to those illustrated and are not beyond the scope and spirit of the present invention.

Each outline element can have a corresponding visual indicator 707 that can alert a user that a media file is linked to a particular outline element 305 positioned adjacent to the visual indicator. The visual indicator 707 can comprise an icon that has a shape corresponding to the media file type. According to one exemplary embodiment, audio files make up the media files and therefore a visual indicator 707 can be shaped in the form of a speaker to alert a user that audio content is associated with a particular outline element 305.

Each outline element 305 may or may not have a corresponding visual indicator 707. For those outline elements 305 which may not have a visual indicator 707, such as the first outline element 305A, it is possible that a media file was not associated with the first outline element 305A for any one of numerous reasons. For example, a user could have paused or stopped the recording of a media file when creating the first outline element 305A. The user could have then activated recording of live event information to the media file when the second outline element 305B was created.

The second outline element 305B can be enclosed or circumscribed by a second visual indicator such as a highlight bar 709 to indicate the current position of an insertion point. Those skilled in the art will appreciate an insertion point corresponds to a position within an electronic document where additional data can be added or "inserted".

Since the insertion point for the current exemplary embodiment display illustrated in FIG. 7A is on the second outline element 305B and because the second outline element 305B comprises a media link 307B (not shown) as evidenced by the visual indicator 707, the media tool bar 700 comprises a time line 715A that includes a position indicator 720A that corresponds with the relative position of the data presented by the second outline element 305B. In other words, a position indicator 720A maps or displays the relative position of the insertion point (that corresponds with the highlight bar 709) within the media file 295 associated with a current page group 300. The media tool bar 700 can further comprise additional features for manipulating a media file 295 corresponding with the current page group 300.

For example, the media tool bar can comprise a play button 725, a stop button 730, a pause button 735, a record button 740, a rewind button 745, a fast forward button 750, and a "See Playback" button 755. The corresponding functionality of the aforementioned buttons will not be discussed for buttons where the names imply the functionality of the buttons to one of ordinary skill in the art. For the "See Playback" button 755, this button can be used to "toggle on" and "toggle off" the second visual indicator 709 that comprises the highlight bar.

The time line or slider bar 715 can be manipulated by a user where the position indicator 720 can be moved backwards or forwards depending upon where a user may want to start retrieving information from a media file corresponding to the page group 300. By moving the position indicator 720A and when the "See Playback" feature is activated by the "See Playback" button 755, the corresponding insertion point will also move in a manner such that outline elements 305 corresponding with the position indicator 720 will be displayed to the user.

Play back of a media file 295 can be activated by the playback button 725, or by activating the first visual indicator 707. Activating the first visual indicators 707 can be achieved by "double clicking" with an appropriate mouse pointer or stylus.

Figure 7B:
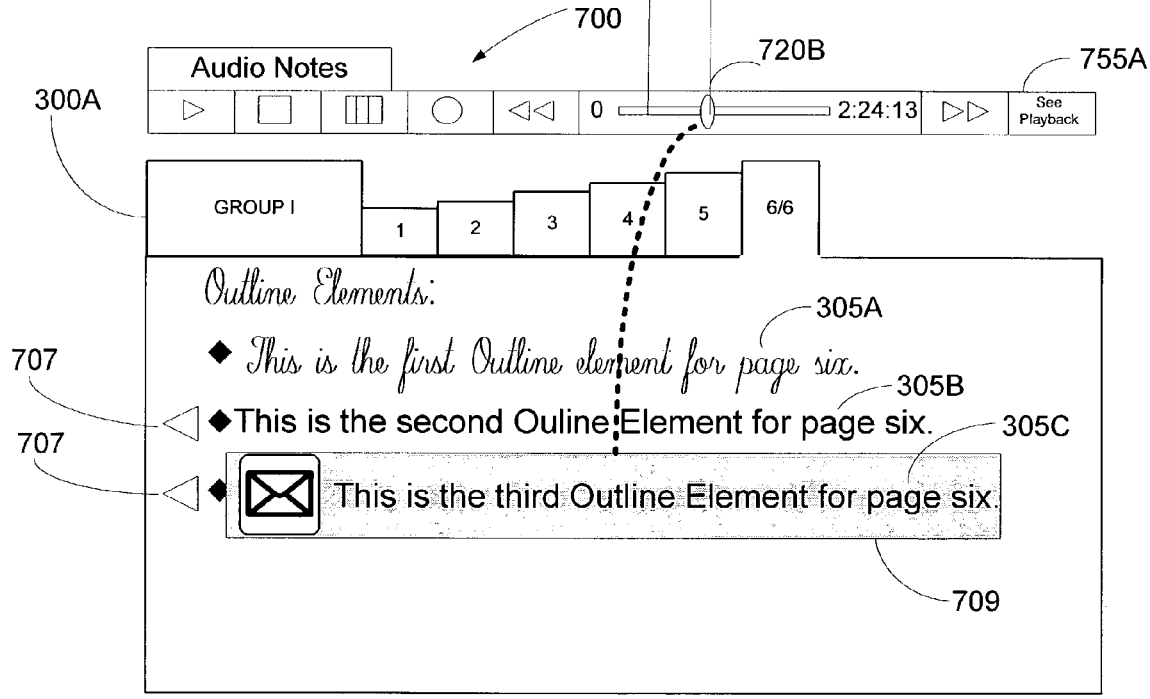

Referring now to FIG. 7B, this figure illustrates another exemplary display of the media tool bar 725B and an exemplary page group 300A. This figure illustrates that the first page of page group 300A is still displayed however a position of the insertion point corresponding to the second visual indicator 709 comprising the highlight bar has changed. As illustrated in this exemplary embodiment, the third outline element 305C was created after the second outline element 305B while the media player/recorder 211 was recording to the media file 295.

Therefore, the media link 307C corresponding to the third outline element 305C has a time stamp that occurs later or after the time stamp corresponding to the second outline element 305B. Accordingly, the position indicator 720 has been moved further in time along the time line or slider bar 715B relative to the position indicator 720A illustrated in FIG. 7A. However, those skilled in the art recognize that outline elements can be created out of sequence during the recording made by the media player/recorder 211.

Therefore, it is possible that the media links 307 (not visible to the user) can be in various sequences or positions on a particular page of a page group 300A. However, in the examples illustrated in FIGS. 7A and 7B, the outline elements 305 were created in sequence meaning that that one outline element 305 was created after the next in a sequential fashion down the page, and, therefore, the corresponding media link comprising the time stamp also correspond to this logical sequencing.

Figure 7C:
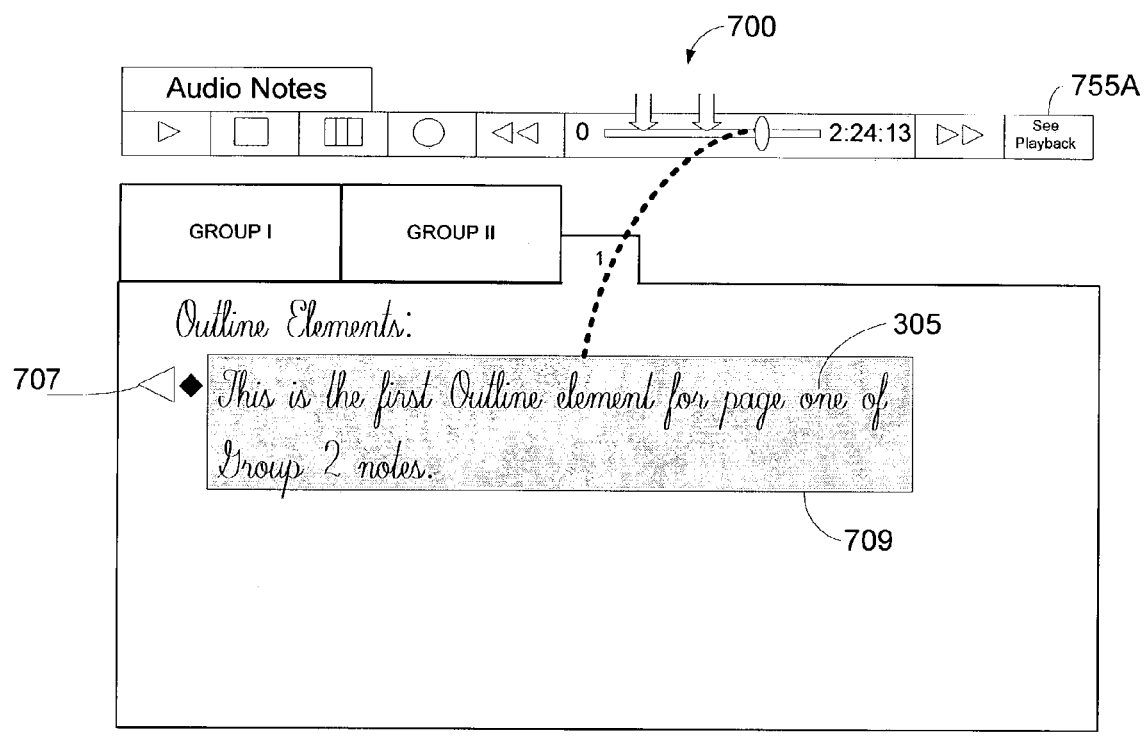

Referring now to FIG. 7C, this figure illustrates a media tool bar 715C and a first page of a second page group instead of a first page of the first page group 300A. The position indicator 720C has been displaced relative to the position indicator 720A, 720B to inform the user that page 2 of the page group 300A has outline elements 305 that occur after and time during play back of the media file 295 relative to the outline elements 305 on the first page of the page group 300A.

FIG. 7C also illustrates that the present invention automatically navigates through pages of content within a page group 300A and across different page groups (not illustrated) when the "See Play back" button 755 has been activated. At any time during play back of the media file 295 corresponding to the current page group 300A, a user can toggle out of the "See Playback" mode by inserting content onto the current page during playback of the media file 295. Other ways to stop or to toggle out of the "see Playback" mode will be discussed in further detail below. FIGS. 7A-7C demonstrate how a second visual indicator 709 can be used to help a user navigate through a media file 295 by displaying the relative position of an outline element 305 within the media file 295.

Exemplary Method for Linking Page Content with a Media File

Certain steps in the processes described below must naturally precede others for the present invention to function as described. However, the present invention is not limited to the order of the steps described if such order or sequence does not alter the functionality of the present invention. That is, it is recognized that some steps may be performed before or after other steps or in parallel with other steps without departing from the scope and spirit of the present invention.

Figure 8:
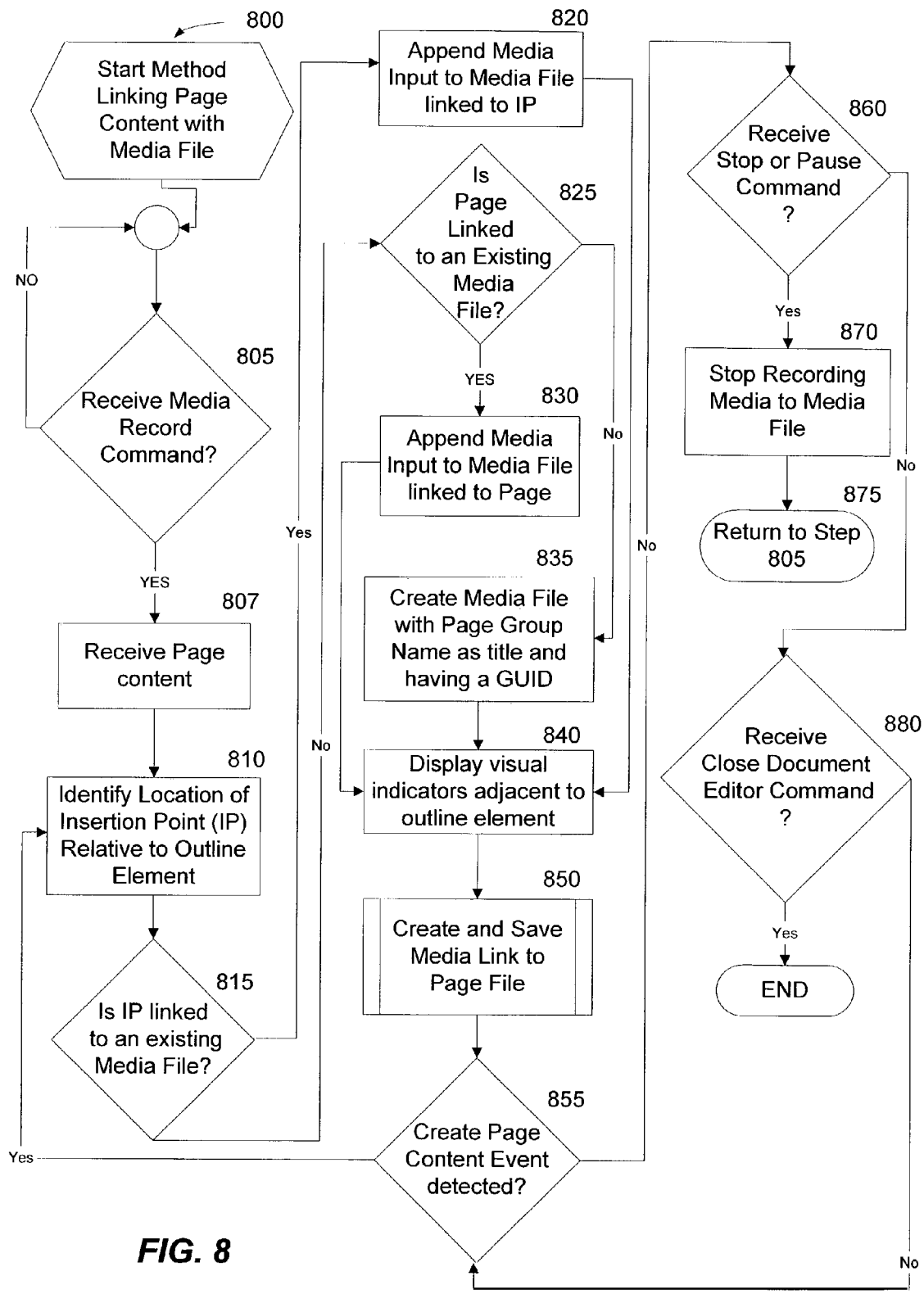
FIG. 8 is a logic flow diagram illustrating an overview of an exemplary process for linking page content with a media file according to one exemplary embodiment of the present invention.

Referring now to FIG. 8, this figure illustrates an exemplary method 800 for linking page content with a media file 295. Method 800 starts with decision step 805 in which it is determined whether a media record command is received by the document editing module 205. As noted above, a media record command can be activated with the record button 725A. However, other ways of activating the media record command such as from a drop down menu and other techniques are not beyond the scope and spirit of the present invention.

If the inquiry to decision step 805 is negative, then the "no" branch is followed back to step 805 for a continuous loop. If the inquiry to decision step 805 is positive, then the "yes" branch is followed to step 810 in which a location of the current insertion point is identified relative to an outlined element 305. In this step, the document editing module determines what particular outline element 305 and its corresponding page in a page group 300 have been selected by a user.

Next, in decision step 815, the document editing module 205 determines if the insertion point is linked to an existing media file. If the inquiry to decision step 815 is positive, the "yes" branch is followed to step 820 in which a document editing module 205 instructs the media services of the windows operating system 135 to append information to the media file linked to the current insertion point.

If the inquiry to decision 815 is negative, then the "no" branch is followed to decision step 825. In decision step 825, the document editing module 305 determines if the current page selected by a user is linked to a media file. If the inquiry to decision step 825 is positive, then the "yes" branch is followed to step 830 in which a document editing module 205 instructs media services of the window operating system 135 to append media input to the media file linked to the current selected page.

If the inquiry to decision step 825 is negative, then the "no" branch is followed to step 835. In step 835, a document editing module 205 instructs media services of the windows operating system 135 to create a media file with a current page group title as the title for the media file and having a specific global universal identifier (GUID).

In step 840, a document editing module 205 displays the first visual indicator 707 such as the "speaker" icon adjacent to the outlined element 305 corresponding to the insertion point to indicate a media file corresponds with the current outline element 305 In routine 850, the document editing module 205 creates and saves a media link 307 comprising the time stamp 310 and GUID 315 to the current page file and corresponding to the current selected outline element 305. Further details of routine 850 will be discussed below with respect to FIG. 9.

Next, in decision step 855, the document editing module 205 determines whether a creation content event has been detected. A creation content event can comprise any one of or a combination of typewritten text, handwritten text in the form of electronic ink, a drawing in the form of electronic ink, and the pasting of material with an electronic clip board. Other creation content events are not beyond the scope and spirit of the present invention.

According to one exemplary embodiment, a creation event generally occurs when a user creates a new outline element with electronic ink or typewritten text. This means that the user starts a new line of electronic ink or a new line of typewritten text by hitting a hard return. Alternatively, a user could select a different page to start generating handwritten notes in the form of electronic ink or typewritten notes. Such navigation to a different page could also constitute a creation content event.

If the inquiry to decision step 855 is positive, then the "yes" branch is followed back to step 810 in which the document editing module 205 identifies a location of the insertion point relative to a current selected outline element. If the inquiry to decision step 855 is negative, then the "no" branch is followed to decision step 860.

In decision step 860, the document editing module 205 determines if a stop or pause command has been received. For example, the document editing module monitors the media tool bar 700 to determine if the stop button 730 or pause button 735 have been activated. If the inquiry to decision step 860 is positive, then the "yes" branch is followed to step 870 in which the document editing module issues a command to the media services of the windows operating system 135 to further instruct the media player/recorder 211 to stop recording or creating the current media file 295. Next, in step 875, the process returns to decision step 805.

If the inquiry to decision step 860 is negative, then the "no" branch is followed to decision step 880 in which the document editing module 205 determines if a close document editor command has been received. If the inquiry to decision step 880 is positive then the "yes" branch is followed in which the process ends. If the inquiry to decision step 880 is negative, then the "no" branch is followed back to decision step 855 in which a document editing module 205 determines if a creation content event has been detected.

Figure 9:
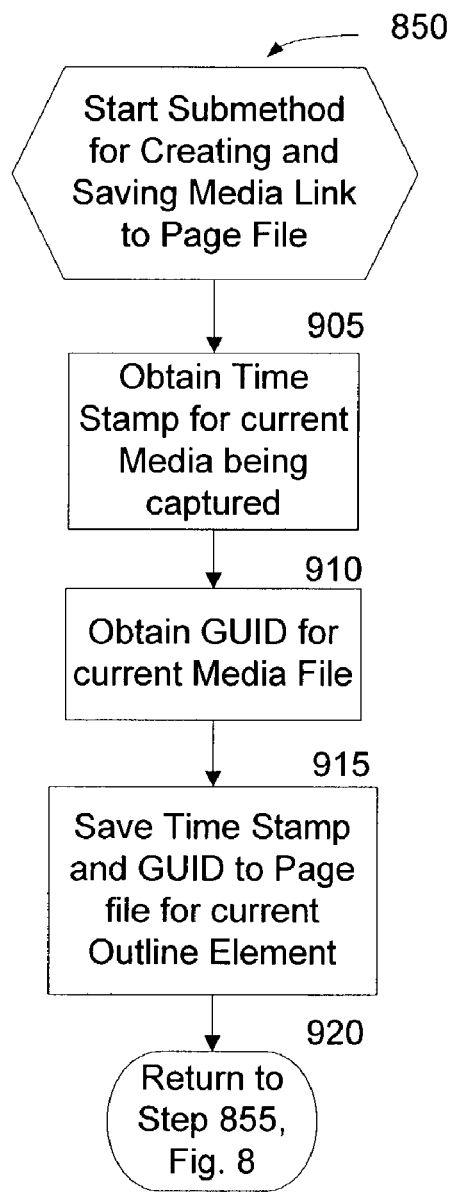
FIG. 9 is a logic flow diagram illustrating a sub-method of FIG. 8 for saving or storing a time stamp and media file identifier to a page file according to one exemplary embodiment of the present invention.

Referring now to FIG. 9, this figure illustrates an exemplary sub-method for routine 850 of FIG. 8 in which the document editing module 205 creates and saves a media link 307 to the currently active page of a page group 300. Step 905 is the first step of the sub-method 850 in which the document editing module receives a time stamp from the media player/recorder 211 for the current media being recorded by the media player/recorder 211. Next, in step 910, the document editing module 205 obtains the global universal identifier (GUID) for the current media file from the media player/recorder 211.

In step 915, the document editing module 205 saves the media link 307 comprising the time stamp 310 and GUID 215 to the page file for the current outline element that is active. Next, in step 920, the process returns to decision step 855 of FIG. 8.

Figure 10:
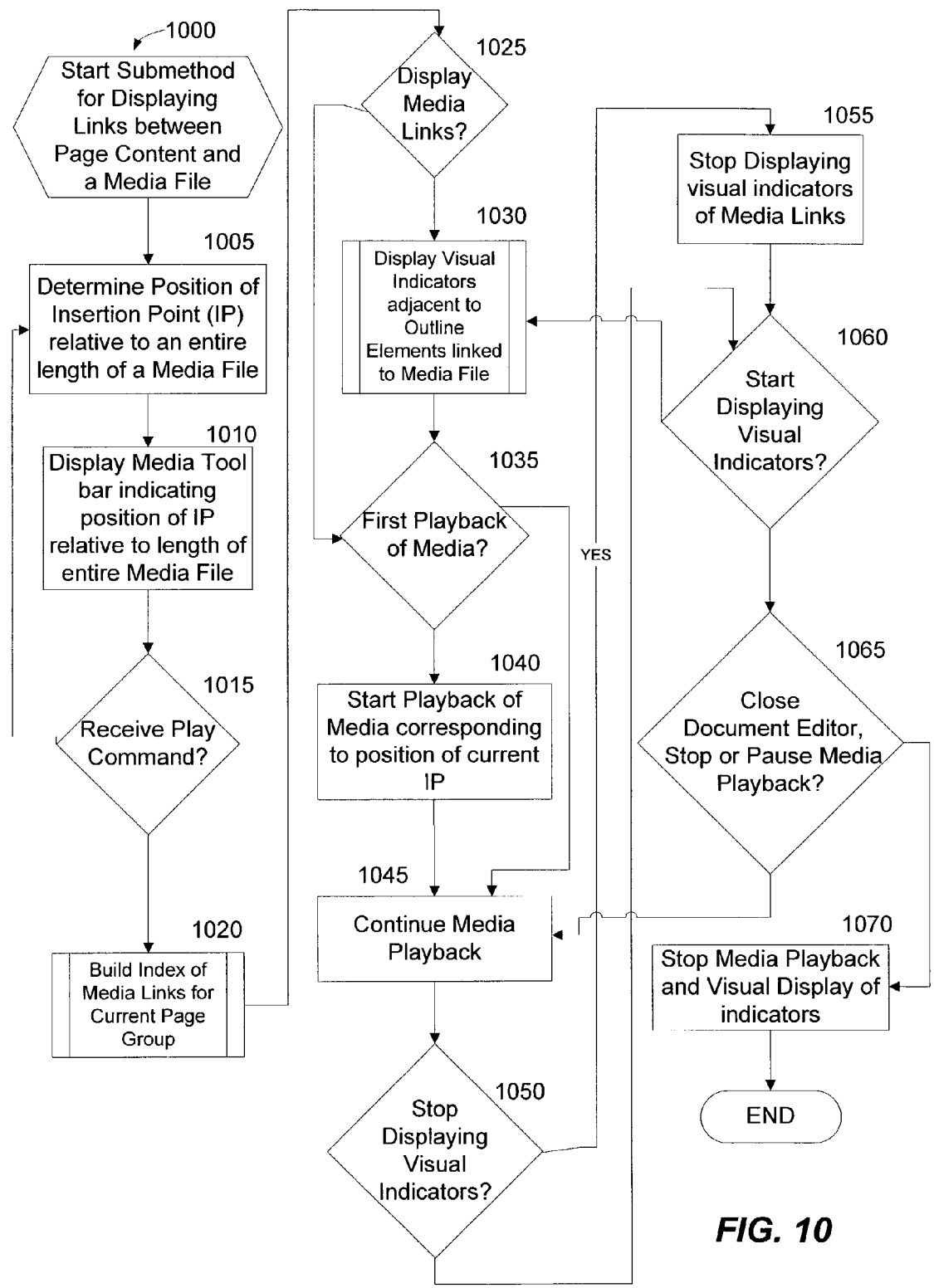
FIG. 10 is a logic flow diagram illustrating an overview of an exemplary process for displaying links between page content and a media file according to one exemplary embodiment of the present invention.

Referring now to FIG. 10, this figure illustrates an exemplary method 1000 for displaying page content associated with a media file 295. Step 1005 is the first step in the process in which a document editing module 205 determines the position of current insertion point relative to an entire length of a media file 295. In this step, the document editing module 205 can look for the closest outline element 305 that has a media link 307.

With this media link 307, the document editing module 205 can calculate a position of a current insertion point if the current insertion point and corresponding outline element has a media link 307 to the media file 295. If the current outline element and current insertion point do not have a media link 307, then the document editing module 205 usually cannot determine the position of the current insertion point relative to the entire length of the media file 295.

In step 1010 the document editing module 205 can display the media tool bar 700 indicating the position of the current insertion point relative to the length of the media file 295. According to this step, the document editing module can display the position indicator 720 at an appropriate position on the time line 115 that comprises a slider bar. However, alternative ways of graphically displaying the relative position or the current insertion point with respect to a corresponding media file are not beyond the scope and spirit of the present invention. For example, the position of the current insertion point could be indicated with a bar graph indicating a percentage complete of a corresponding media file.

In decision step 1015, the document editing module 205 can determine whether a play command has been received. In this step, the document editing module 205 can monitor input that can be received with the media tool bar 700. Further, the document editing module can determine if a play command has been received through other ways such as a drop down menu present within the document editing module 205 (not illustrated).

In routine 1020, the document editing module 205 can build an index of media links for the current page group 300 that is active. Further details of routine 1020 will be discussed below with respect to FIG. 11.

Next, in decision step 1025, the document editing module 205 can determine whether visual indicators such as the highlight bar 709 are desired. In other words, a document editing module step 205 can determine whether a user has activated the "See Playback" button 755. If the inquiry to decision step 1025 is negative, then the "no" branch is followed to decision step 1035. If the inquiry to decision step 1025 is positive, then the "yes" branch is followed to routine 1030 in which the document editing module 205 can display visual indicators such as the highlight bar 709 adjacent to or circumscribing the outline elements linked to the current media file 295. Further details of routine 1030 will be discussed below with respect to FIG. 12.

Next, in decision step 1035, it is determined whether this is a first play of a media file 295. If the inquiry to decision step 1035 is positive, then the "yes" branch is followed to decision step 1040 in which play of the media file 295 is started at a position corresponding to the media link associated with the current insertion point. The process then continues back to decision step 1025. If the inquiry to decision step 1035 is negative, then the "no" branch is followed to step 1045.

In step 1045, play back of the current media file is continued. Next, in decision step 1050, the document editing module 205 determines whether an event has occurred in which the visual indicators such as the highlight bar 709 should be stopped. Exemplary events which are monitored by the document editing module 205 in this step can include, but are not limited to, creation of a new outline element, navigating to a different page or different page grouping, cutting or pasting of material to or from a current page. Other events that can stop the presentation of the link between the page content and media file are not beyond the scope and spirit of the present invention.

If the inquiry to decision step 1050 is positive, then the "yes" branch is followed to step 1055 in which the presentation of visual indicators by the document editing module 205 is stopped. If the inquiry to decision step 1050 is negative, then the "no" branch is followed to decision step 1060 in which the document editing module 205 determines if a start visual indicators command has been issued. In other words, the document editing module determines if the "See Playback" command button 755 has been activated. If the inquiry to decision step 1060 is positive, then the "yes" branch is followed back to routine 1030. If the inquiry to decision step 1060 is negative, then the "no" branch is followed to decision step 1065.

In decision step 1065, the document editing module 205 determines if a close document editor, stop media playback, or pause media playback command has been issued. If the inquiry to decision step 1065 is negative, then the "no" branch is followed back to step 1045 in which playback of the media is continued. If the inquiry to decision step 1065 is positive, then the "yes" branch is followed to step 1070 in which the document editing module 205 stops displaying the second visual indicators comprising the highlight bars 709 and the document editing module 205 issues a command to the media services of the window operating system 135 to stop playback of the media file 295. The process then ends.

Figure 11:
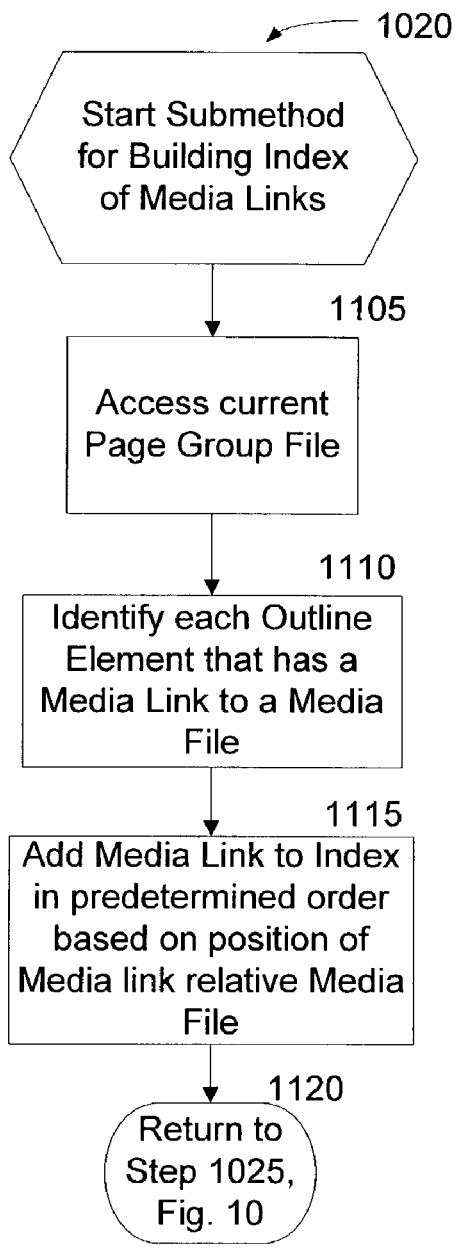
FIG. 11 is a logic flow diagram illustrating a sub-method of FIG. 10 for building an index of time stamps for a page grouping according to one exemplary embodiment of the present invention.

Referring now to FIG. 11, this figure illustrates an exemplary routine or sub-method 1020 for building an index of media links 307 for a current page group 300. The first step of routine 1020 is step 1105 in which the document editing module 205 accesses the current page group file 290. In this step 1105, the document editing module 205 can access each page of the page group 300. Next, in step 1110, the document editing module 205 can identify each outline element in each of the page files that has a media link comprising a time stamp 310 and a GUID 315.

In step 1115, the media link 307 for a current outline element 305 can be added to the index in a relative position based upon the time stamp 310 of the media link 307. The process then returns to step 1025 of FIG. 10.

Figure 12:
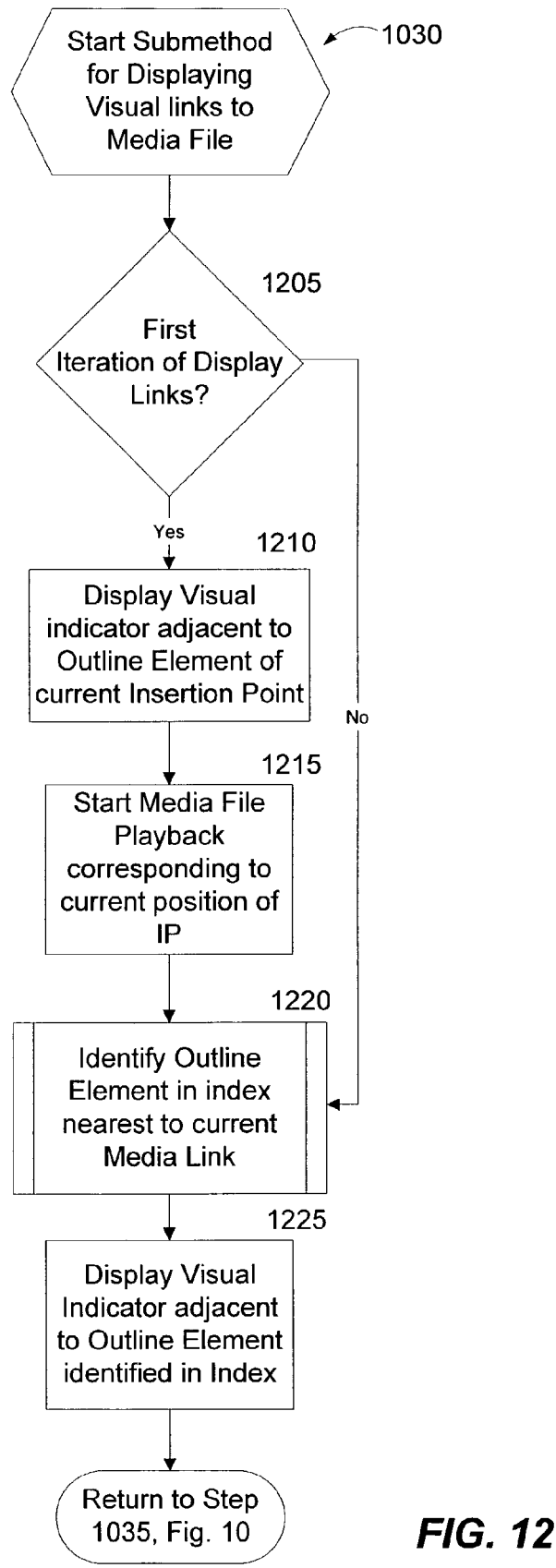
FIG. 12 is a logic flow diagram illustrating a sub-method of FIG. 10 for displaying visual indicators adjacent to outline elements linked to a media file according to one exemplary embodiment of the present invention.

Referring now to FIG. 12, this figure illustrates an exemplary routine or sub-method 1030 of FIG. 10 for displaying visual indicators such as highlight bars 709 adjacent to the outline element identified in the index. Decision step 1205 is the first step of routine 1030 in which it is determined whether this is a first iteration of accessing the index. The inquiry to decision step 1205 is negative, then the "no" branch is followed to routine 1220. If the inquiry to decision step 1205 is positive, then the "yes" branch is followed to step 1210.

In step 1210, the document editing module 205 displays the second visual indicator such as the highlight bar 709 adjacent to the outline element 305 corresponding to the current insertion point. Next, in step 1215, the document editing module 205 issues a command to the media services of the windows operating system 135 to start play back of the media file corresponding to the media link of the current insertion point. The process then returns to step 1035 of FIG. 10.

In routine 1220, the document editing module 205 identifies the outline element in the index that is nearest to the current time stamp being received from the media player/recorder 211. Further details of routine 1220 will be discussed below with respect to FIG. 13.

In step 1225, the document editing module 205 displays the second visual indicator comprising the highlight bar 709 adjacent to or surrounding the outline element identified in the index. The process then returns to step 1035 of FIG. 10.

Figure 13:
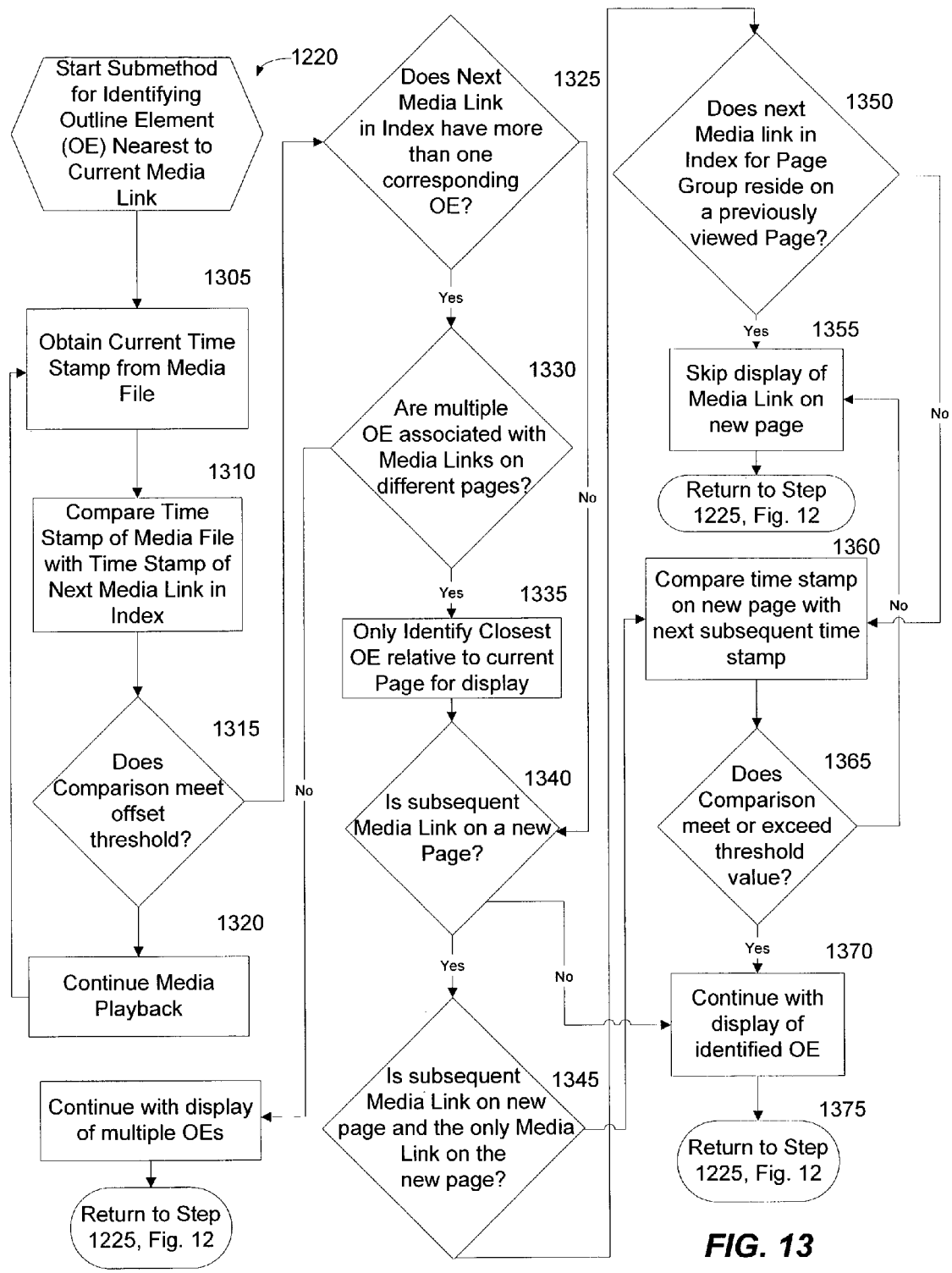
FIG. 13 is a logic flow diagram illustrating a sub-method of FIG. 12 for identifying outline elements in a time stamp indexed that are nearest to a current time stamp according to one exemplary embodiment of the present invention.

Referring now to FIG. 13, this figure illustrates an exemplary sub-method or routine 1220 for identifying an outline element 305 in the index that is nearest to the current time stamp 310 being evaluated by the document editing module 205. A first step of routine 1220 and step 1305 in which the document editing module 205 receives the current time stamp 310 of the media file 295 being played.

In step 1310, the document editing module 205 compares the time stamp 310 of the current media link 307 of a current insertion point with a media link 307 of the next media link 307 in the index.

In decision step 1315, a document editing module determines 205 if the comparison between the current media link 307 and a subsequent media link 307 in the index meets a predetermined threshold. In other words, in decision step 1315, the document editing module 205 can determine if the current media link 307 being evaluated meets a predetermined period of time.

In other words, it is recognized that when notes are created from presented information, notes typically lag the presented live event information by a certain amount of time such as fifteen seconds. However, the present invention is not limited to this predetermined threshold of fifteen seconds and other values smaller or larger than fifteen seconds are not beyond the scope and spirit of the present invention. If the inquiry to decision step 1315 is negative, then the "no" branch is followed to step 1320 in which playback of the current media file is continued. The process then returns to step 1305.

If the inquiry to decision step 1315 is positive, then the "yes" branch is followed to decision step 1325 in which the document editing module 205 determines if the current media link 307 in the index has more than one corresponding outline element 305. In other words, the document editing module 205 determines if a current media link 307 may be associated with more than one line of electronic ink or typewritten text. If the inquiry to decision step 1325 is negative, then the "no" branch is followed to decision step 1340. If the inquiry to step 1325 is positive, then the "yes" branch is followed to decision step 1330.

In decision step 1330, the document editing module 205 determines if the multiple outline elements 305 associated with the current media link 307 are on different pages. If the inquiry to decision step 1330 is negative, then the "no" branch is followed to step 1332 in which the display of multiple outline elements 305 on a same page is continued. Next in step 1334, the process returns to step 1225 of FIG. 12.

If the inquiry to decision step 1330 is positive, then the "yes" branch is followed to step 1335 in which a document editing module 205 only identifies for display the closest outline element 305 relative to the current page. In other words, the document editing module 205 drops other outline elements 305 that are on different pages relative to an outline element that 305 is present on a current page that is active.

In decision step 1340, the document editing module 205 determines if a subsequent media link 307 after the current media link 307 being evaluated is on a new page. In other words, the document editing module 205 is determined if the current media link 307 is a random note on a random page that is out of sequence with the current presentation of visual indicators. The present invention is designed to minimize page flipping and to minimize random navigation between pages for isolated notes that may have been added during the recording of information by a user.

If the inquiry to decision step 1340 is negative (meaning that more than one media link exists on the next page corresponding to the current media link 307), the "no" branch is followed to step 1370. If the inquiry to decision step 1340 is positive, then the "yes" branch is followed to decision step 1045.

In decision step 1345, it is determined if the current media link 307 is on a new page is the only media link 307 on the new page. In other words, the document editing module 205 is trying to determine the relative importance of a random note as will be evidenced from the decision steps that follow this decision step. If the inquiry to decision step 1345 is negative (meaning that there is more than one media link on the new page containing the current media link) the "no" branch is followed to step 1360.

If the inquiry to decision step 1345 is positive, then the "yes" branch is followed to decision step 1350 in which the document editing module 205 determines if the current media link 307 on the new page refers to a page that was previously viewed or displayed to a user. If the inquiry to decision step 1350 is negative, then the "no" branch is followed to step 1360. If the inquiry to decision step 1350 is positive, then the "yes" branch is followed to step 1355 in which the document editing module 205 skips the current media link 307 and proceeds back to step 1320 in which play back of the media file 295 is continued.

In step 1360 the time stamp 315 of the current media link 307 is compared with the time stamp 315 of a subsequent media link 307. Next, in decision step 1365, the document editing module 205 determines if the comparison between the time stamps 315 of media links 307 meets a predetermined threshold. In other words, the document editing module is determining if there could be additional notes on the page containing the media link that may not have media links associated with the media file 295.

If the time stamp 315 indicates that the current media link is referring to an outline element 305 that is very short, then the document editing module 205 will skip the current media link 307. That is, if the inquiry to decision step 1365 is negative, then the "no" branch will be followed to step 1355 in which the current media link is skipped. If the inquiry to decision step 1365 is positive, then the "yes" branch is followed to step 1370 in which a document editing module 205 continues with identifying the current media link 307 for display. In step 1375, the process returns to step 1225 of FIG. 12.

Alternate Embodiments (not Illustrated)

When a user is playing back a media file and viewing the corresponding links between the media file and the page content, the user can disengage or stop the display of links while the media file is played if the user attempts to insert new page content during this play back. According to an alternate exemplary embodiment, the document editing module 205 can create a media link for this added material made during playback. In this way, during a second playback, the additional material added by the user could be displayed with an appropriate visual indicator 709 to demonstrate the newly formed media link with the media file.

CONCLUSION

Accordingly, the present invention provides a method and system for linking page content with a media file such that a user can easily navigate between the page content and the media file as necessary. The present invention also links page content with a media file where visual indicators are provided to allow a user to see the connection between the written word and the recorded spoken word in a media file. The invention also links page content with a media file such that a user can point to page content and the corresponding recorded medium will be synchronized with the selected page content.

It should be understood that the foregoing relates only to illustrative embodiments of the present invention, and that numerous changes may be made therein without departing from the spirit and scope of the invention as defined by the following claims.

What is claimed is:

1. A method for linking page content with a media file comprising:
   recording media in the media file;
   receiving page content associated with the media in an electronic document;
   receiving a time stamp and a global unique identifier corresponding to the media during recording of the media file;
   generating a media link comprising the time stamp and the global unique identifier; and
   storing the media link adjacent to the page content in the electronic document wherein when the page content in the electronic document is selected, the media corresponding to the media link is synchronized with the page content selected for playback;
   identifying a position of an insertion point within the page content in the electronic document;
   determining whether the insertion point is linked to the media file or another media file;
   appending media input at the insertion point to any media file linked to the insertion point in response to determining that the insertion point is linked to the media file or another media file;
   in response to determining that the insertion point is not linked to any media file, determining whether a current page selected is linked to the media file or another media file; and
   in response to determining that the current page selected is linked to the media file or another media file, appending media input at the insertion point to any media file linked to the current page;
   wherein the insertion point corresponds to a position within the electronic document where additional data can be added.

2. The method of claim 1, wherein recording media on a media file further comprises recording audio to an audio file.

3. The method of claim 1, wherein recording media on a media file further comprises recording one of video to a video file or audio/video to an audio/visual file.

4. The method of claim 1, wherein receiving page content associated with the media in an electronic document further comprises receiving at least one of electronic ink, typed text, a drawing made with electronic ink, or information pasted from an electronic clip board.

5. The method of claim 1, further comprising displaying at least one visual indicator in the electronic document adjacent to, over, or circumscribing a portion of the page content to signify that a media link has been generated for the portion of the page content.

6. The method of claim 5, further comprising:
   playing the media wherein displaying the visual indicator comprises:
      highlighting the portion of the page content as a portion of the media associated with the portion of the page content is played; and
      un-highlighting the portion of the page content as the media is played away from the portion of the media associated with the portion of the page content.

7. The method of claim 6, further comprising:
   displaying a media tool bar comprising a timeline with a position indicator wherein a location of the position indicator on the timeline corresponds to a relative position within the media file of the portion of the page content highlighted comprising the insertion point.

8. The method of claim 5, further comprising:
   receiving a selection of the visual indicator; and
   in response to receiving the selection, playing a portion of the media linked to the portion of the page content associated with the visual indicator.

9. The method of claim 1, further comprising:
   receiving a selection of a portion of the page content in the electronic document;

synchronizing the media with the portion of the page content selected; and playing the media beginning at a portion of the media synchronized with the portion of the page content selected in response to receiving the selection.

10. A method for linking a media file with page content on a page of an electronic document and displaying links visually, comprising:

receiving input to display links between page content and the media file;

playing the media file;

identifying a position of an insertion point within the page content in the electronic document;

determining whether the insertion point is linked to the media file or another media file;

appending media input at the insertion point to any media file linked to the insertion point in response to determining that the insertion point is linked to the media file or another media file;

in response to determining that the insertion point is not linked to any media file, determining whether a current page selected is linked to the media file or another media file; and in response to determining that the current page selected is linked to the media file or another media file, appending media input at the insertion point to any media file linked to the current page;

wherein the insertion point corresponds to a position within the electronic document where additional data can be added; and displaying visual indicators on the page at least one of adjacent to, over, or enclosing portions of the page content for predetermined periods of time during playback of the media file therein illustrating how the portions of the page content relate to portions of the media file.

11. The method of claim 10, wherein displaying visual indicators on the page at least one of adjacent to, over, or enclosing portions of the page content further comprises displaying visual indicators on the page at least one of adjacent to, over, or enclosing portions of the page content that have been assigned a media link.

12. The method of claim 11, wherein the media link comprises at least one of a time stamp or a global unique identifier corresponding to the media file.

13. The method of claim 10, wherein playing a media file further comprises playing at least one of an audio, visual, or an audio/visual file.

14. The method of claim 10, wherein displaying visual indicators further comprises highlighting page content at predetermined intervals.

15. The method of claim 10, further comprising navigating through pages of the electronic document as the media file is being played.

16. The method of claim 10, further comprising building an index of media links.

17. A computer system for linking page content with a media file and for displaying links to the media file, comprising:

a processing unit;

a memory storage device;

a display device coupled to the processing unit for displaying data; and a program stored in the memory storage device for providing instructions to the processing unit, the processing unit responsive to the instructions of the program, operable for:

recording media;

receiving page content on a page in an electronic document;

generating a media link that associates the page content and the media, the media link comprising a time stamp;

playing the media;

identifying a position of an insertion point within the page content in the electronic document;

determining whether the insertion point is linked to the media file or another media file;

appending media input at the insertion point to any media file linked to the insertion point in response to determining that the insertion point is linked to the media file or another media file;

in response to determining that the insertion point is not linked to any media file, determining whether a current page selected is linked to the media file or another media file; and in response to determining that the current page selected is linked to the media file or another media file, appending media input at the insertion point to any media file linked to the current page;

wherein the insertion point corresponds to a position within the electronic document where additional data can be added; and displaying one or more visual indicators on the page adjacent to page content at intervals during playback of the media each visual indicator representing a media link between the page content and the media.

18. The system of claim 17, wherein the program stored in the memory storage device for providing instructions to the processing unit comprises a document editing module.

19. The system of claim 17, wherein the processing unit is further operable for building an index of media links associated with page content prior to displaying the visual indicators wherein the index is used to determine which portions of the page content is highlighted at specific times during playback of the media.

* * * * *